US007093266B2

(12) United States Patent
Parry

(10) Patent No.: US 7,093,266 B2
(45) Date of Patent: *Aug. 15, 2006

(54) STREAM CLASS DRIVER FOR COMPUTER OPERATING SYSTEM

(75) Inventor: William G. Parry, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 161 days.

This patent is subject to a terminal disclaimer.

(21) Appl. No.: 10/950,911

(22) Filed: Sep. 27, 2004

(65) Prior Publication Data

US 2005/0044553 A1 Feb. 24, 2005

Related U.S. Application Data

(63) Continuation of application No. 09/819,085, filed on Jul. 27, 2001, now Pat. No. 6,845,508, which is a continuation of application No. 08/994,674, filed on Dec. 19, 1997, now abandoned.

(51) Int. Cl.
*G06F 9/46* (2006.01)

(52) U.S. Cl. ..................................... 719/322

(58) Field of Classification Search ............... 719/322, 719/324, 327, 321; 718/102; 717/100, 116; 713/1, 100
See application file for complete search history.

(56) References Cited

U.S. PATENT DOCUMENTS

| 5,307,491 | A | * | 4/1994 | Feriozi et al. ............... 719/326 |
| 5,432,941 | A | * | 7/1995 | Crick et al. .................... 713/1 |
| 5,465,364 | A | * | 11/1995 | Lathrop et al. ............. 719/321 |
| 5,574,920 | A | * | 11/1996 | Parry ......................... 713/340 |
| 5,604,843 | A | * | 2/1997 | Shaw et al. ................... 358/1.1 |
| 5,634,058 | A | * | 5/1997 | Allen et al. ................... 717/163 |
| 5,787,259 | A | * | 7/1998 | Haroun et al. ............. 709/253 |
| 5,903,894 | A | * | 5/1999 | Reneris ....................... 707/100 |
| 5,926,775 | A | * | 7/1999 | Brumley et al. ............ 702/127 |
| 6,179,489 | B1 | * | 1/2001 | So et al. ...................... 718/102 |
| 6,202,211 | B1 | * | 3/2001 | Williams, Jr. ................ 725/78 |
| 6,711,181 | B1 | * | 3/2004 | Xue et al. .................... 370/504 |
| 6,845,508 | B1 | * | 1/2005 | Parry .......................... 719/322 |
| 2004/0139351 | A1 | * | 7/2004 | Tsang .......................... 713/201 |

OTHER PUBLICATIONS (No name given), I2C Interface Support in Windows, Dec. 2001, http://64.233.161.104/search?q=cache:eik4O03NsBcJ:www.microsoft.com/whdc/archive/i2c.mspx+stream+and+minidriver&hl=en&start=1.*

(Continued)

*Primary Examiner*—Sue Lao
(74) *Attorney, Agent, or Firm*—Workman Nydegger

(57) ABSTRACT

A stream class driver for use in a computer operating system functions together with a minidriver. The minidriver is associated with a particular design for an adapter, which is a hardware device that generates or receives streaming data. The stream class driver deals with common operating system tasks such as direct memory access, scatter/gather memory use and Plug n Play. The stream class driver is independent of the hardware design and can therefore function with any type of streaming device or external buses such as USB or IEEE 1394. the minidriver functionality is limited to only those functions required by the unique aspects of the hardware and for the minimum requirements of operation, thereby minimizing the complexity and burden of designing minidrivers for hardware devices.

13 Claims, 3 Drawing Sheets

OTHER PUBLICATIONS (No name given), Stream Class and Minidriver Interface, Apr. 2005, http://msdn.microsoft.com/library/default.asp?url=/library/en-us/VidCapStream/hh/vidcapstream/strmini-design_98e75677-fe1d-4c27-8142-2ed6c8fd324b.xml.asp.*

Elliott et al.; Our Exclusive Class Library Speeds Building Windows NT Kernal-Mode Device Drivers; Microsoft Systems Journal; vol. 11, No. 9; pp. 35-55.*

Heath, Bob; Understanding Class and Port Drivers; Digital Systems Journal; Jan./Feb. 1994; pp. 11-15 and 46.*

Oney; Surveying the New Win32 Driver Model for Windows 98 and Windows NT 5.0; Microsoft Systems Journal; vol. 12, No. 1; Nov. 1997; pp. 35-43.*

(No name given), Window Driver Model Article, Jun. 1999, http://72.14.207.104/search?q=cache:GQLHeNBBBPcJ:www.phdcc.com/WDMarticle.html+(class+driver)+and+minidriver+&hl=en&start=10.*

* cited by examiner

STREAM CLASS DRIVER FOR COMPUTER OPERATING SYSTEM

CROSS-REFERENCE TO RELATED APPLICATIONS

The present application is a continuation application of U.S. patent application Ser. No. 09/819,085 filed Jul. 27, 2001 now U.S. Pat. No. 6,845,508, entitled "Stream Class Driver for Computer Operating System" which is incorporated herein by reference.

BACKGROUND OF THE INVENTION

1. The Field of the Invention

The present invention pertains in general to computer software operating systems, and more particular to a river for a class of devices which generate or receive streaming data.

2. The Relevant Technology

A rapidly growing area of interest in the field of computer technology is that of "multimedia". This term generally refers to the concurrent use of video and audio in a computer system for a wide range of applications including business and entertainment.

The primary applications which have led to the tremendous success of personal computers have been based on the power of these computers to process numbers in complex ways such as through spreadsheets, graphics, word processing and data bases. However, in such applications, the application program works with a discrete data file and typically works with only a small part of such a data file at any one time. Multimedia applications add a major new aspect to the processing of data by personal computer. This is the requirement to manage and process a continuous stream of data as opposed to discrete data files which are typically processed by an application program. The stream of data associated with a multimedia application is generally far too large to be loaded in memory, and in many cases the data is continuous with no predetermined end of the data. A further feature of multimedia streaming data is that it is sequential in nature and frequently is time dependent, that is, it must not only be processed in a specific sequential order, it must also be processed to produce precisely times sequential events.

An example of multimedia streaming data is the output which is produced by a DVD (Digital Versatile Disk) apparatus. The contemporary DVD apparatus produces data using the MPEG-2 video and audio format. This output actually comprises three separate data streams which are video, audio and subpicture. Each of these streams requires separate processing, but the results of the processing must be time synchronized and generated at a predetermined absolute rate to obtain the desired results. Video and audio signals must be properly synchronized and timed to generate a viable multimedia presentation.

A standardized computer platform, including hardware and software, must be able to work a large number of independently produced multimedia adapters, such as DVD players, video cameras, audio sources and ROM discs. Each of these products requires a separate, complex driver which functions to interface application programs through the computer operating system to the specific hardware in order to process the multimedia streaming data to produce continuous outputs. However, to accommodate the massive amounts of data and the extensive, complex processing of this data required for a successful multimedia application, the driver must be highly efficient, well designed and capable of performing a wide range of functions within the operating system and functions required by the application program. With the growing complexity of operating systems and the greater demands of application programs, it is very difficult for each independent producer of a hardware device, particularly for multimedia, to produce an efficient, current and effective driver for that product. Thus, there exists a need to reduce the burden of producing drivers for multimedia products.

In other areas of computer system operation, such as for pointing devices, for example, a mouse, it has been proposed to have a hardware independent driver associated with the operating system and have a hardware dependent driver provided by the hardware manufacturer for each particular device. See U.S. Pat. No. 5,465,364 entitled "Method and System for Providing Device Driver Support Which is Independent of Changeable Characteristics of Devices and Operating Systems." Pointing Devices, however, do not have the same problems that are encountered with multimedia applications. The data rate for pointing devices is extremely low, the data processing is not particularly complex and the pointing device is extremely low, the data processing is not particularly complex and the pointing device is generally a support aspect of an application program, in contrast to being an aspect that is a principle part of a multimedia application.

In view of the substantial problems encountered in the use of multimedia applications on personal computes, and the insatiable consumer demand for greater bandwidth and data processing sophistication, there is a need for a multimedia driver configuration which can efficiently handle the volume and complexity of streaming data while at the same time minimizing the burden and difficulty of driver design for the independent developers and manufacturers of multimedia products.

BRIEF SUMMARY OF THE INVENTION

The present invention is a method of operation, and corresponding computer program units, for a stream class driver which is used in conjunction with a minidriver. The minidriver is associated with a hardware adapter which generates or receives streaming data. The operation of the stream class driver product begins with receiving of initialization data from the minidriver followed by registration of the initialization data for later use by the stream class driver. After registration, the stream class driver creates a device object for the adapter. The stream class driver then sends a command to the minidriver to initialize the adapter. Next, the stream class driver requests that the minidriver provide adapter stream information for all of the data streams handled by the adapter. The minidriver provides this information and the stream class driver registers the received adapter stream information. The stream class driver may then provide a command to the minidriver to turn off power to the adapter and then pages out the minidriver and subsequently awaits a data stream request.

Upon receipt of a data stream request, the stream class driver pages in the minidriver to active memory. A command is generated to the minidriver to turn on power to the adapter. The stream class driver provides a data stream open command and stream structure data to the minidriver as needed to open the data stream requested by an application program. Next, the stream class driver provides a stream read or a stream write command to the minidriver. Properties and control information in a predefined data format related to the stream request are transmitted from the stream class driver to the minidriver. Upon receipt of a data stream termination command initiated by an application program, the stream class driver provides a stream close command to the minidriver. Finally, the stream class driver provides an uninitialization command to the minidriver for uninitializing the adapter.

In a further aspect of the present invention, the stream class driver can open additional data streams for either reading or writing streaming data concurrently with the first data stream.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE PREFERRED EMBODIMENTS

Figure 1:
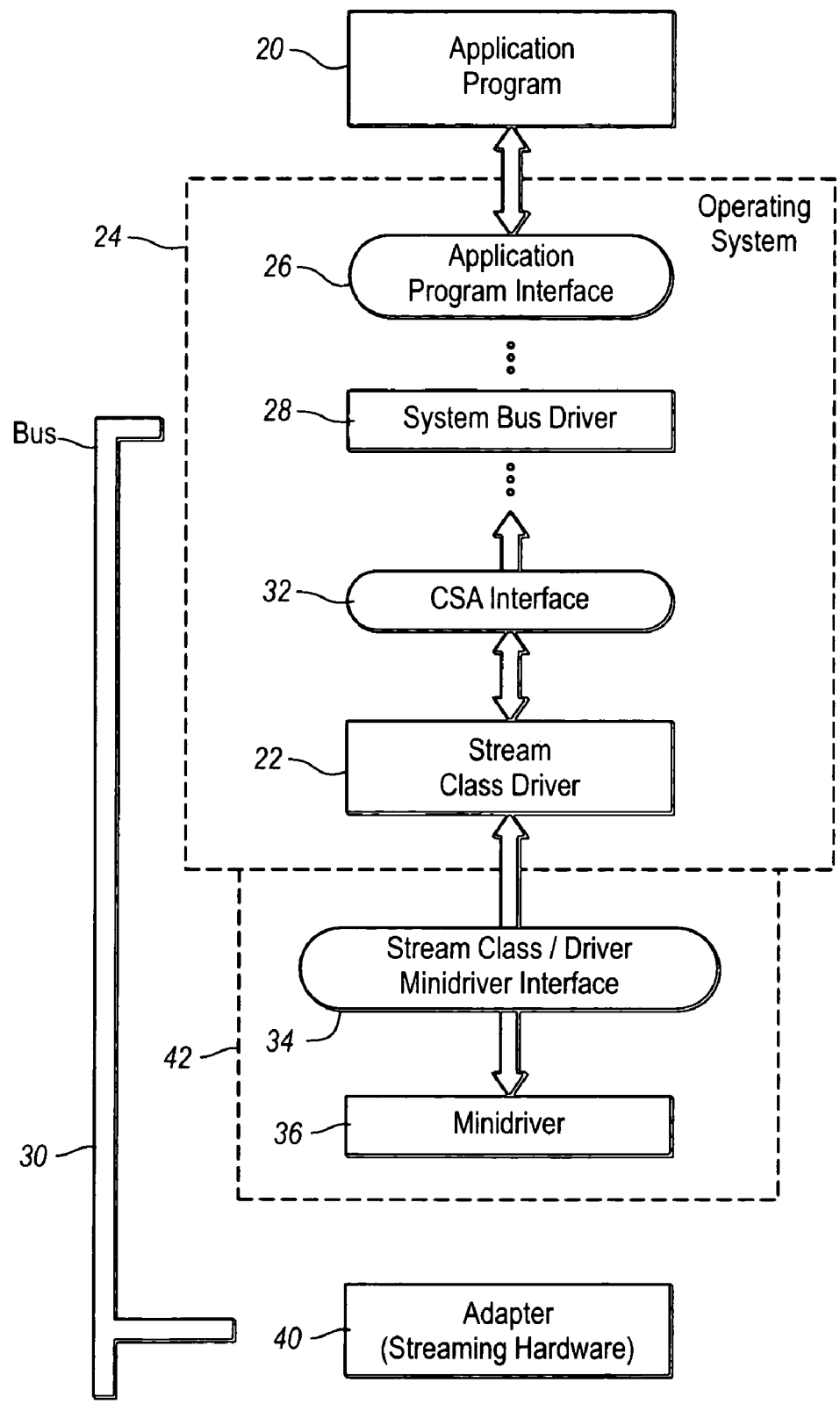
FIG. 1 is a block diagram of a portion of a computer system illustrating the relationship of the streaming class driver in accordance with the present invention with an operating system, an application program, a related minidriver and an adapter which is an apparatus which handles streaming data.

The present invention includes a stream class driver for use in a computer operating system. The purpose of this stream class driver is to make the writing of hardware drivers (minidrivers) for streaming devices much simpler. The functions performed by the minidriver are limited to those functions which are unique or necessary for the associated hardware, while the stream class driver performs all of the functions which are not dependent upon the particular hardware implemented.

Terminology

The principal terms used in describing the functions, data structures, commands and other aspects of the present invention are defined as follows:

1. AC-3: An audio standard for delivering digital audio developed by Dolby Laboratories.

2. ActiveMovie: A cross-platform API developed by Microsoft Corporation for developers of multimedia applications that provide a user-mode connection and stream architecture to support high quality digital video, high fidelity audio, and special effects, now termed "Direct Show."

3. Adapter: a hardware device for generating, handling or consuming streaming data.

4. API: Application Programming Interface—A set of routines that an applications program uses to request and carry out lower-level services performed by a computer operating system.

5. CSA: Connection and Streaming Architecture—A functional specification produced by Microsoft Corporation defining an architecture and interface for application programs using streaming data and synchronization tasks. This is kernel-mode streaming in WDM.

6. DLL: Dynamic Link Library—An API routine that user mode applications access through ordinary procedure calls.

7. DMA: Direct Memory Access.

8. Driver: Kernel Mode used to either control a hardware device or to emulate a hardware device.

9. EISA: Extended Industry Standard Architecture, a 32-bit bus configuration developed as an extension of ISA.

10. Filter: An entity which performs a specified function and includes a collection of related connection points called pins.

11. GUID: Globally Unique Identifier. A quantity which is unique and includes a current date/time and a sequence number and which is used to allow any party to create an identifier which will not overlap other identifiers similarly created.

12. IEEE 1394: A standardized serial bus for high speed data transfer.

13. IOCTL: I/O control.

14. IRP: I/O Request Packet—Data structures that drivers use to communicate with each other.

15. IRQ: Interrupt Request—A method by which a device can request to be serviced by the device's software driver.

16. ISA: Industry Standard Architecture—legacy bus configuration for original personal computer design.

17. ISO: International Standards Organization.

18. ISR: Interrupt Service Routine.

19. Kernel Mode: The processor mode which allows full, unprotected access to the system. A driver or thread running in kernel mode has access to system memory and hardware.

20. Minidriver: A hardware specific DLL that uses a class driver to accomplish most actions through functional calls and provides only device-specific controls.

21. MPEG: Moving Pictures Expert Group—A standard for compression and transmission of digital video.

22. PCI: Peripheral Component Interconnect—A high-performance, 32-bit or 64-bit bus designed to be used with devices that have high bandwidth requirements such as the display subsystem.

23. Pin: A set of properties which describe a potential connection point to a filter.

24. PIO: Programmed input/output, which is much like a complement to DMA.

25. Plug and Play (PnP): An enumerator standard for automatically detecting and recognizing installed hardware, as defined by Microsoft Corporation.

26. SRB: Stream Request Block.

27. USB: Universal Serial Bus—A bidirectional, isochronous, dynamically attachable serial interface for adding peripheral devices such as game controllers, serial and parallel ports, and input device on a single bus.

28. User Mode: The nonprivileged processor Mode in which application code executes.

29. VxD: Virtual Device Driver—A device driver that runs at the privileged ring 0 protected Mode of the microprocessor.

30. WDM: Windows 32 Driver Model—a 32 bit driver model based on the Windows NT driver model that is designed to provide a common architecture of I/O services and binary-compatible device drivers for both Windows NT and Windows operating system for specific classes of drivers.

31. Windows NT Driver Model: The layered device driver model used under the Windows NT operating system (see "Inside Windows NT" by Helen Custer (Microsoft Press 1993)).

32. Windows NT: Refers to the Microsoft Corporation Windows NT Version 4.0 operating system, including any add-on capabilities and any later versions of the operating system.

Operational Description

The operating environment of the present invention is illustrated in FIG. 1. This drawing shows selected hardware and software within a personal computer system which is preferably a system using an Intel Corporation x86 microprocessor and a Microsoft Corporation operating system, such as Windows NT. The present invention is used within the illustrated environment for supporting a multimedia application, such as an application program 20. The present invention is directed to a stream class driver 22, which is preferably included within an operating system 24. The application program 20 interacts with the operating system 24 through an application programming interface (API) 26. The operating system 24 includes the conventional features and operating aspects, not illustrated, which are well-known in the industry. A system bus driver 28is a part of the operating system 24 and is used to provide communication through a bus 30, such as PCI bus used with personal computers.

The upper edge of a stream class driver 22 of the present invention is accessed through a CSA interface 32, which is defined in "Windows Driver Model Connection and Streaming Architecture Design Notes and Reference", published by Microsoft Corporation. This document, which is incorporated herein by reference, is a part of the "MEMPHIS" designated operating system documentation entitled Windows 98 Developer's Release Device Driver Kit (DDK).

CSA interface 32 is further defined in U.S. patent application Ser. No. 08/825,957, filed Apr. 4, 1997, entitled "Method and Computer Program Product for Reducing Inter-Buffer Data Transfers Between Separate Processing Components", which is incorporated herein by reference.

The class driver 22 can be embodied in a computer readable medium such as magnetic disk, optical disk or magnetic tape.

The lower edge connection the stream class driver 22 is defined by a stream class driver/minidriver interface 34, which is specified in detail herein and in the attached appendices.

A minidriver 36 communicates through the interface 34 with the stream class driver 22. Minidriver 36 is a unique design corresponding to the hardware adapter 40. The adapter 40 is preferably a device that generates or consumes steaming data, such as used in a multimedia application. An example of the adapter 40 is a DVD player which produced digital audio and video streams for a motion picture.

Minidriver 36 is a hardware-specific DLL that uses the class driver 22 to accomplish most actions through function calls, and provides only device-specific controls. The minidriver 36 registers each adapter, such as 40, with the class driver 22, and the class driver 22 creates a device object to represent each adapter 40 that it registered. This process is described in more detail below. Minidriver 36 uses the class driver's device object to make system calls.

The adapter 40 is connected to transmit and receive commands and to transmit and receive data through the bus 30. In a typical implementation, the application program 20 is a multimedia application that uses streaming data provided by the adapter 40 through the bus 30.

Operating system aspect 42 includes the minidriver 36, which is unique to the adapter 40, but when implemented with a particular computer system becomes a part of the operating system 24 of that computer.

The internal interface 34 between the class driver 22 and the minidriver 36 is primarily a set of function calls between these drivers. The class driver 22 controls the request flow, calling the minidriver 36 when access to the adapter 40 hardware is necessary. The class driver 22 is responsible for multiprocessor and interrupt synchronization. Once both the class driver 22 and the minidriver 36 are initialized, the minidriver 36 is passive and is called only by the class driver 22. Most of the function calls from the minidriver 36 to the class driver 22 are low-level service requests.

The detailed description for the specific embodiment of the present invention presented herein includes the description in the appendices that follow. These are:

Appendix I Stream Class Driver Functions (Stream Class Drive 22)

Appendix II Minidriver Functions (Minidriver 36)

Appendix III Stream Request Block (Interface 34 SRB)

Appendix IV SRB Command Codes for the Adapter (Interface 34 Device Code)

Appendix V Stream Specific Command Codes (Interface 34 Stream Command Code)

These appendices describe in detail the functions, data structures and commands for the interface 34.

Figure 2:
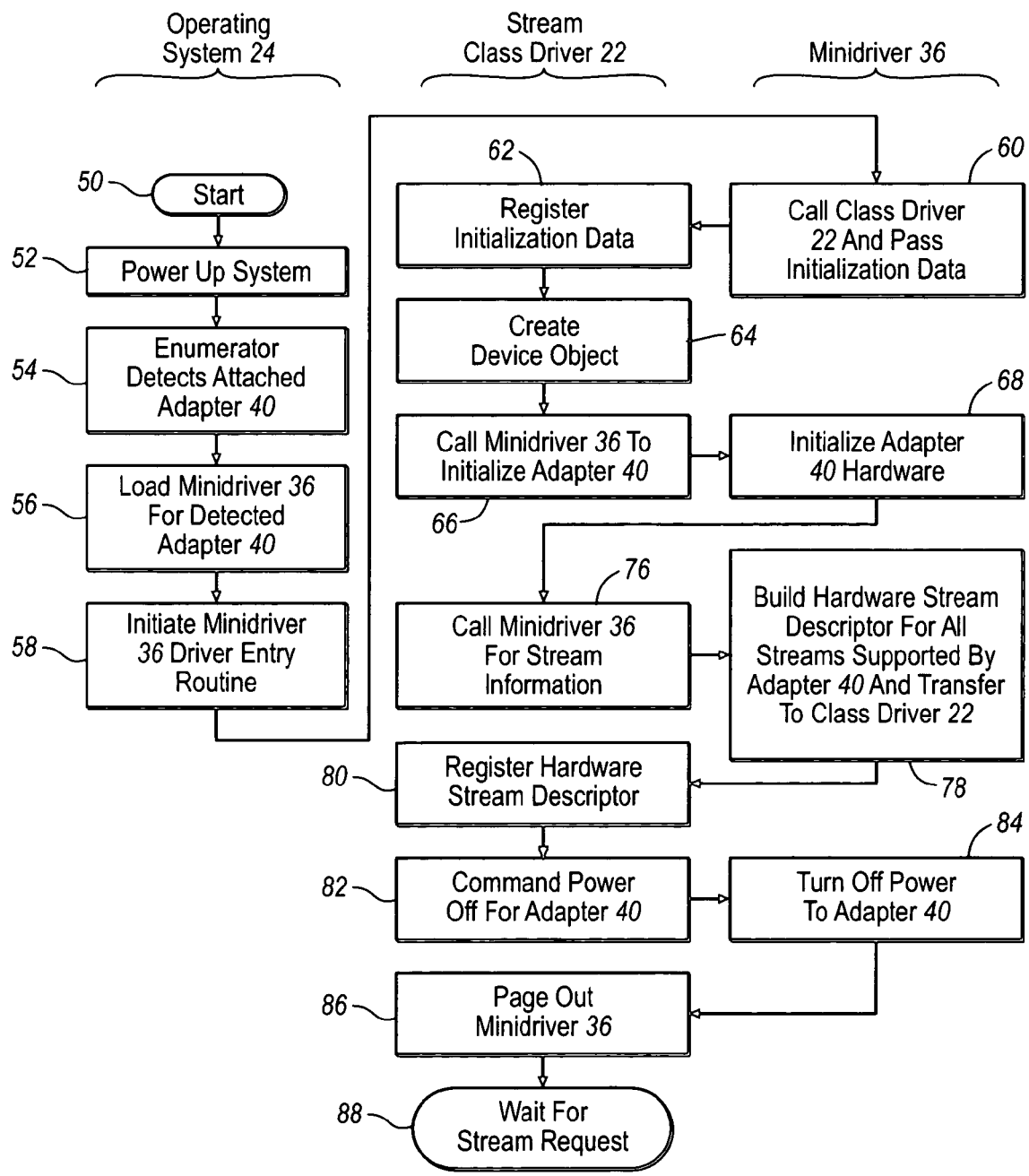
FIG. 2 is a flow diagram illustrating the initialization of the streaming data adapter through functions carried out by the operating system, the streaming class driver and the minidriver.

FIG. 2 illustrates the operation of the present invention in conjunction with the operating system 24 and minidriver 36 to initialize the multimedia aspects of the computer system in preparation for receiving a data stream request from application program 20. As shown in FIG. 2, the steps of operation are divided in columns between the operating system 24, stream class driver 22 and minidriver 36.

The operating system 24 functional operation begins at a start point 50. Next, step 52 is performed to power up the system and perform the conventional self tests which are well known in the personal computer industry.

After the system has been powered up and the operating system initialization process is performed, step 54 is executed in which an enumerator, such as Plug n Play detects the attached adapter 40. When the adapter has been detected, the Plug n Play enumerator, in step 56, loads into memory the minidriver 36 for the detected adapter 40. In step 58, the Plug n Play initiates the minidriver 36 Driver-Entry routine, as describe in Appendix II.

Further referring to FIG. 2, the next functional step carried out is performed by the minidriver 36 in step 60. In this step the minidriver 36 calls the class driver 22 function StreamClassRegisterAdapter. (See Appendix I) The minidriver 36 further collects and passes the data structure termed HW_INITIALIZATION_DATA. This data structure is described in detail in Appendix II.

From step 60, control is transferred to step 62, which is performed by the stream class driver 22. Within step 62, the initialization data provided in the HW_INITIZLIZATION_DATA structure is registered, that is, it is recorded in memory for use by the class driver 22. Next, in step 64, the stream class driver 22 creates a device object corresponding to the adapter 40. The minidriver 36 will not create a device object, but instead will share the class driver 22 device object as needed. Only one device object is created per adapter.

In step 66, the stream class driver 22 calls the minidriver 36 to initialize the adapter 40. This is done by calling the minidriver's function HWReceivePacket with the command SRB_INITIALIZE_DEVICE. (See Appendix IV).

In step 68, the minidriver 36 initializes the adapter 40 hardware by performing the required setup and loading in the adapter any code required for operation of the hardware.

In step 76, control is returned to the streaming class driver 22 which calls the minidriver 36 for stream information. This is done with the command SRB_GET_STREAM_INFO (Appendix IV), which is sent to the minidriver function HWReceivePacket.

Upon receipt of the SRB_GET_STREAM_INFO command, the minidriver 36 in step 78 builds a hardware stream descriptor for all streams that are supported by the adaptor 40. This information is returned to the class driver 22. In step 80, the streaming class driver 22 registers the hardware stream descriptor in memory for future use.

Next, in step 82, the stream class driver 22 generates a power off command which is transmitted to the minidriver 36 for the adapter 40. (See Appendix IV) In general, the operating system 24, with driver 22, will turn off power to the adapter 40 whenever it is not being used, especially for battery powered computers.

The minidriver 36 receives the power off command in step 84 and turns off power to the adapter 40. In many systems, particularly portable computer systems, the adapter 40 is a device which uses a relatively substantial amount of electrical power. By disabling the adapter 40 when not in use, system power will be conserved.

Control is returned to the stream class driver 22 in step 86 wherein the driver 22 pages out the minidriver 36 program so that it is no longer stored in active memory, thus freeing resources for use by the application program 20, operating system 24 or other active applications. The device object is preferably closed, by closing its file handle, prior to paging out the minidriver 36. Finally, the class driver 22 enters state 88 to wait for a stream request which requires use of the adapter 40.

Upon completion of the steps shown in FIG. 2, the computer system multimedia subsystem has been initialized and set to be ready to use the adapter 40 for streaming data when needed.

Figure 3:
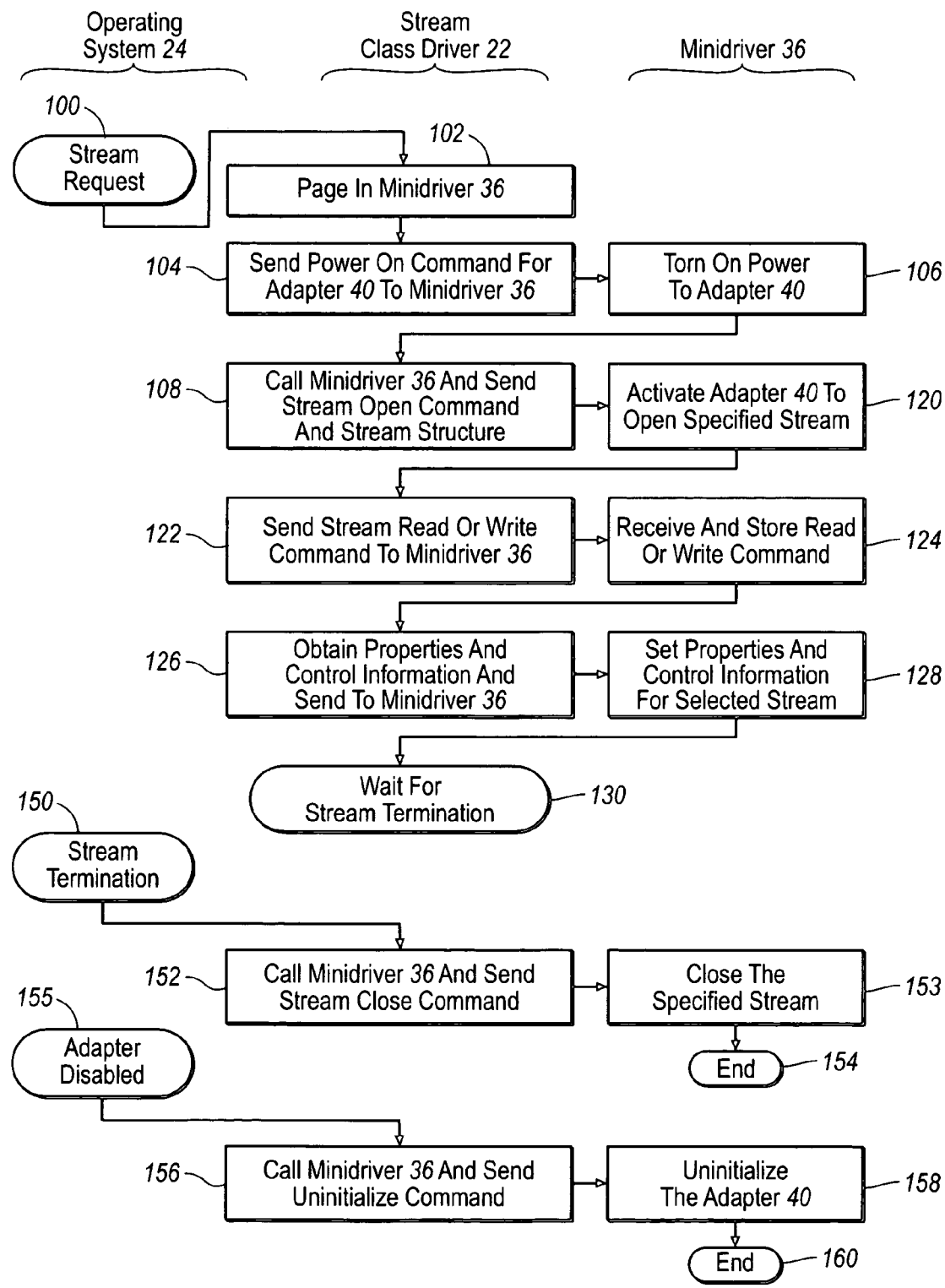
FIG. 3 is a flow diagram illustrating the steps that are carried out, after initialization, for requesting and terminating a data stream in accordance with the present invention.

Referring to FIG. 3, there is shown a series of interrelated operations carried out by the operating system 24, class driver 22 and minidriver 36 after the multimedia subsystem has been initialized as shown in FIG. 2. These operations are carried out to initiate and terminate a data stream request. A stream request 100 is generated by the operating system 24 in response to the application program 20. The data stream request is provided to the stream class driver 22 which responds in step 102 to page in the minidriver 36. This step loads the minidriver 36 into active memory. If the device object has been closed, it is opened prior to paging in the minidriver. If the minidriver 36 has not been paged out, step 102 is not needed.

In step 104, the stream driver 22 sends a power on command to the minidriver 36 for the adapter 40. This command is received by the minidriver 36 and in step 106 it turns on power to the adapter 40 by transmitting appropriate commands to the adapter 40 through the bus 30. Steps 104 and 106 are not needed if power has not been terminated to the adapter 40.

In step 108, the driver 22 calls the minidriver function HWReceivePacket with the command SRB_OPEN_STREAM (Appendix IV) and further provides a data structure HW_STREAM_OBJECT. (See Appendix III) This data structure provides the information needed by the adapter 40 and minidriver 36 to service a stream command which will be received from the application program 20.

Upon receipt of the stream open command, the minidriver 36 performs step 120 to activate the adapter 40 and open the specified stream. For the described example wherein the adapter 40 is a DVD, the specified stream could be the video stream. For other streams, such as audio, a new stream request 100 would need to be generated through the operating system 24 by the application program 20.

When the step 120 has been confirmed, the class driver 22 sends either a stream read (SRB_READ_DATA) or a stream write (SRB_WRITE_DATA) command to the minidriver function ReceiveDataPacket, as specified in the HW_STREAM_OBJECT for the selected stream. The minidriver 36 receives and stores the read or write command at step 124.

In step 126, the class driver 22 sets properties and other control information for the selected stream by passing the appropriate stream request block (SRB) to the minidriver's ReceiveControlPacket function as specified in the HW_STREAM_OBJECT for the selected stream.

At step 128, the minidriver 36 sets the properties and control information received for the selected data stream so that the data stream transfer proceeds as requested by the application program 20. At this point, the minidriver 36 is responsible for the streaming data request until it notifies the class driver 22 that the request has been completed.

In state 130, the class driver 22 waits for receipt of a stream termination command while the streaming data transfer proceeds between adapter 40 and application program 20.

When the application program 20 has completed use of the specified data stream, a stream termination 150 command is generated by the operating system 24 and transferred to the class driver 22 at step 152. In this step, the stream class driver 22 calls the minidriver 36 and sends a stream close command, SRB_CLOSE_STREAM, to the minidriver's HWReceivePacket function. In response to this command, the minidriver 36 at step 153 closes the specified stream. The transfer of data for the current stream is completed at an end state 154. After step 153, the class driver 22 may, optionally, close the device object, page out the minidriver 36, and turn power off to the adapter 40.

When the operating system 24 detects at step 155 that the adapter 40 has been disabled by the user, physically removed, or the system is being shut down, control is transferred to the driver 22 at step 156 in which the driver 122 calls the minidriver 36 and sends an uninitialization command SRB_UNINITIALIZE_DEVICE. In step 158 the minidriver 36 performs the actions needed to uninitialize the adapt 34 40. The actions required are dependent upon the particular design of the adapter 40, and will vary from one manufacturer to the next. After the adapter 40 has been uninitialize, the minidriver 36 operation terminates at the end state 160.

While a streaming data request is being processed, the streaming adapter 40 may generate interrupts. When an interrupt is detected, the class driver 22 will call the minidriver 36 interrupt service routine, as described in Appendix II. All of the minidriver 36 functions are synchronized with the adapter 40 ISR. This is done to make the minidriver 36 nonreentrant. Nonreentrancy is accomplished by masking off the IRQ of the adapter 40 (and all lower priority IRQs) when code is being executed in any of the minidriver 36 routines. When a thread is executing in the minidriver 36, no calls will be made to any other function within the minidriver 36, including the ISR. This nonreentrancy holds true even on multiprocessor systems, making the minidriver 36 very easy to write.

Due to routine synchronization and request serialization, the minidriver 36 is multiprocessor safe and nonreentrant for low-to-medium-end hardware. The processing described above has correct file operation synchronization. For example, stream and adapter 40 opens are correctly serialized without having the minidriver 36 implement mutexes, semaphores, or events. All low-level buffer management is handled by the class driver 22. This includes allocation of DMA adapter object, as necessary, mapping of buffers and building scatter/gather list of for DMA, and locking and flushing buffers appropriately in DMA versus PIO cases. All IOCTL parameter validation is performed by the class driver 22. All requests are timed by the class driver 22 with a watchdog timer.

A particular advantage for the class driver 22 of the present invention is that it can work with a wide variety of streaming hardware devices such as MPEG, video capture, USB audio and video and IEEE 1394 audio and video.

In summary, a driver configuration for streaming data includes a stream class driver for performing system operations which are independent of the streaming data adapter and a minidriver which performs a minimum set of functions that are dependent upon the specific hardware design implemented for the adapter. As a result, the minidriver design is greatly simplified and can be more easily implemented for each of a large number of streaming class devices.

Although one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

APPENDIX I

Stream Class Driver Functions

Each of the following functions can be called by the minidriver 36 at any time, except in the following instances:

- If the minidriver 36 has set the TurnSynchronizationOff Boolean, these services must be called at IRQL <= DISPATCH LEVEL. Additionally, when this Boolean is set, some of these services should not be called by the minidriver, as specified in the following text. Turn off synchronization (by setting the TurnOffSynchronization Boolean) if the minidriver needs to go to passive level (low priority) for most requests.
- If the minidriver 36 is running a Low priority callback by calling StreamClassCallAtNewPriority with Low priority specified, this Low priority callback should not call any stream class services *except* StreamClassCallAtNewPriority with priority LowToHigh.

1. StreamClassScheduleTimer

The StreamClassScheduleTimer routine is used to schedule a timed callback.
VOID STREAMAPI StreamClassScheduleTimer(
    IN PHW_STREAM_OBJECT *StreamObject* OPTIONAL,
    IN PVOID *HwDeviceExtension*,
    IN ULONG *NumberOfMicroseconds*,
    IN PHW_TIMER_ROUTINE *TimerRoutine*,
    IN PVOID *Context*
);

Parameters

*StreamObject*
    Optionally points to the stream object if the timer is to be scheduled for a stream.

*HwDeviceExtension*
    Points to the minidriver's device extension.

*NumberOfMicroseconds*
    Indicates the amount of time that should expire before the timer routine should be called.

*TimerRoutine*
    Routine that is called (at high priority) when NumberOfMicroseconds has elapsed.

*Context*
>Supplies the parameter to be passed into the timer routine function.

Return Values

None.

Comments

>The TimerRoutine function called in the StreamClassScheduleTimer routine informs the class driver that the minidriver needs to be called back at a certain time in the future. This is a one-shot timer that must be rescheduled each time it is called. The format of the minidriver's timer procedure is as follows:

typedef VOID
>(STREAMAPI*PHW_TIMER_ROUTINE)( //timer-callback routine
>IN PVOID *Context*
>);

Parameters

*Context*

2.   StreamClassRegisterAdapter

The StreamClassRegisterAdapter routine is called by the minidriver from its DriverEntry routine, the minidriver's initial entry point.
NTSTATUS StreamClassRegisterAdapter(
>IN PVOID *Argument1*,
>IN PVOID *Argument2*,
>IN PHW_INITIALIZATION_DATA *HwInitializationData*
>);

Parameters

*Argument1*
>Contains the parameter value with which the operating system called the adapter minidriver's initialization routine. This parameter is the driver object.

*Argument2*
>Contains the parameter value with which the operating system called the adapter minidriver's initialization routine.

*HwInitializationData*
>Supplies the initialization parameters for the adapter minidriver, as previously defined.

3. StreamClassDeviceNotification

The StreamClassDeviceNotification routine notifies the stream class driver of device-specific status changes.

VOID StreamClassDeviceNotification(
    IN STREAM_MINIDRIVER_DEVICE_NOTIFICATION_ TYPE
*Notification Type,*
    IN PVOID *HwDeviceExtension,*
    ...
);

Parameters

*HwDeviceExtension*
    Points to the adapter minidriver's storage for adapter data.

*Notification Type*
    Contains the type of notification.

```
typedef enum_STREAM_MINIDRIVER_DEVICE_NOTIFICATION_TYPE {
    ReadyForNextDeviceRequest,
    DeviceRequestComplete,
    DeviceNotificationMaximum
}STREAM_MINIDRIVER_DEVICE_NOTIFICATION_TYPE,
    *PSTREAM_MINIDRIVER_DEVICE_NOTIFICATION_TYPE;
```

| Notification | Description |
| --- | --- |
| ReadyForNextDeviceRequest | Indicates that the adapter minidriver is ready for another device request This notification should be sent after each HW_RECEIVE_DEVICE_SRB call, as soon as the adapter minidriver is ready for another request for the device. This notification has no effect if the TurnOffSynchronization value is set to TRUE by the minidriver. |
| DeviceRequestComplete | Indicates that the supplied device SRB has completed. After this notification, the class driver owns the request, so it should not be accessed by the adapter minidriver. The third parameter must be a pointer to an SRB. The status of the SRB should be set appropriately. |
| DeviceNotificationMaximum | Indicates whether ordinal has exceeded maximum. |

Return Values

None.

4. StreamClassStreamNotification

The StreamClassStreamNotification routine notifies the class driver of stream-specific status changes.

VOID StreamClassStreamNotification(

IN STREAM_MINIDRIVER_STREAM_NOTIFICATION_TYPE *Notification Type,*

IN PHW_STREAM_OBJECT *Stream Object*

...
);

Parameters

*StreamObject*
    Supplies the stream object.

*Notification Type*
    Supplies the type of notification.

```
typedef enum _STREAM_MINIDRIVER_STREAM_NOTIFICATION_TYPE {
    ReadyForNextStreamDataRequest,
    ReadyForNextStreamControlRequest,
    HardwareStarved,
    StreamRequestComplete,
    StreamNotificationMaximum
} STREAM_MINIDRIVER_STREAM_NOTIFICATION_TYPE,
    *PSTREAM_MINIDRIVER- STREAM_NOTIFICATION_TYPE;
```

| Notification | Description |
| --- | --- |
| ReadyForNextStreamDataRequest | Indicates that the adapter minidriver is ready for another control request for the stream specified by *StreamObject*. This notification should be sent after each HW_RECEIVE_STREAM_DATA_SRB call, as soon as the adapter minidriver is ready for another request for this data type. This notification has no effect if the TurnOffSynchronization Boolean is set by the minidriver. |

| | |
|---|---|
| ReadyForNextStreamControlRequest | Indicates that the adapter minidriver is ready for another control request for the stream specified by Stream Object. This notification should be sent after each DATA_RECEIVE_STREAM_CONTROL_SRB call, as soon as the adapter minidriver is ready for another request for this data type. This notification has no effect if the TurnOffSynchronization Boolean is set by the minidriver. |
| HardwareStarved | Indicates to the class driver that the minidriver is starved for data for the specified data type. |
| StreamRequestComplete | Indicates that the supplied stream SRB has completed. After this notification the class driver owns the request, so it must not be accessed by the adapter minidriver. The third parameter must be a pointer to an SRB. The status of the SRB should be set appropriately. |
| StreamNotificationMaximum | To be provided in a future draft. |

Return Values

None.

5. StreamClassCallAtNewPriority

The StreamClassCallAtNewPriority routine is used to schedule a callback at a different priority.

VOID StreamClassCallAtNewPriority(

IN PHW_STREAM_OBJECT *StreamObject* OPTIONAL,

IN PVOID *HwDeviceExtension,*

IN STREAM_PRIORITY *Priority,*

IN PHW_PRIORITY_ROUTINE *PriorityRoutine,*

IN PVOID *Context*

);

Parameters

*Stream Object*
    Optionally contains the stream object pointer if the priority callback is for a particular stream.

*HwDeviceExtension*
    Contains the pointer to the minidriver's device extension.

*Priority*
    Indicates the priority being requested. Definitions are as follows:

```
typedef enum _STREAM_PRIORITY {
High,
Dispatch,
Low,
LowToHigh
} STREAM_PRIORITY, *PSTREAM_PRIORITY;
```

| Priority | Description |
| --- | --- |
| High | Priority at which the minidriver's functions are normally called. If the minidriver has scheduled a dispatch priority call and needs to return to high priority, this priority should be specified. For example, if the minidriver has disabled its adapter interrupts and scheduled a DispatchPriority event, the minidriver should schedule a HighPriority event from the DispatchPriority event, and re-enable card interrupts when the specified HighPriority entry point is called. Doing so will avoid reentrancy in the minidriver. |
| Dispatch | Used to specify if the additional processing will take less than 1 millisecond. The adapter should not interrupt after this notification call is made, so interrupts should be disabled on the card before specifying this call, or the minidriver's ISR will be re-entered. |
| Low | Used to specify if the additional processing will take more than 1 millisecond. The adapter should not interrupt after this notification call is made, so interrupts should be disabled on the card before specifying this call, or the minidriver's ISR will be re-entered. Additionally, any of the minidriver's request functions and any |

|   |   |
|---|---|
|   | scheduled timers will reenter the minidriver when this priority is scheduled.<br><br>Note: If the minidriver has left synchronization enabled (NoSynchronization boolean NOT set) no stream class driver services can be called by a low priority thread except from StreamClassCaliAtNewPriority with LowToHigh. |
| LowToHigh | Used to allow a thread called at low priority to return to high priority, so other stream class driver services can be called. |

*PriorityRoutine*
Entry point within the mini driver to be called at the lower priority.

*Context*
Supplies the parameter to be passed into the priority routine function.

Return Values

None.

Comments

This PriorityRoutine function in the StreamClassCallAtNewPriority routine informs the class driver that the minidriver needs to be called back at a lower priority. Note that this function cannot be called if the minidriver has set the TurnOffSynchronization Boolean for the adapter. This service should be used if a significant number of processor instructions must be executed from ISR request, or other entry points in the minidriver. The format of the minidrivers priority callback routine is as follows:

typedef VOID
    **(STREAMAPI *PHW_PRIORJTY _ROUTINE)(**
    IN PVOID *Context*
    );

6.    StreamClassGetPhysicalAddress

The StreamClassGetPhysicalAddress routine is used to translate a virtual address into a physical address range that can be used directly by adapters through busmaster DMA.

STREAM_PHYSICAL_ADDRESS StreamClassGetPhysicalAddress(

IN PVOID *HwDeviceExtension,*

IN PHW_STREAM_REQUEST _BLOCK *HwSRB* OPTIONAL,
IN PVOID *VirtualAddress,*

IN STREAM_BUFFER_TYPE *Type,*

OUT ULONG *\*Length*

);

Parameters

*HwDeviceExtension*
    Points to the adapter minidriver's storage for adapter data.

*HwSRB*
    (Optional) Supplies an SRB.

*VirtualAddress*
    Supplies the virtual address to be translated. The SRB is required if the address came from the DataBuffer field of a STREAM_REQUEST _BLOCK.

*Type*
    Indicates the type of buffer pointed to by *VirtualAddress*. Allowable types are listed as follows:

```
typedef enum {
PerRequestExtension
DmaBuffer
SRBDataBuffer
} STREAM_BUFFER_TYPE;
```

| Buffer Type | Description |
| --- | --- |
| PerRequestExtension | Indicates the physical address of the SRB extension. |
| DmaBuffer | Indicates the physical address of the DMA buffer. |
| SRBDataBuffer | Indicates the physical address of the data buffer. |

*Length*
    Returns the length of the physical memory segment.

Return Values

The StreamClassGetPhysicalAddress routine returns the length, in bytes, of the physical memory segment.

Comments

The StreamClassGetPhysicalAddress routine can be used to build a scatter/gather list for DMA data transfers that span physical data pages. The returned length indicates the length in bytes of the physical segment. Note that the length returned can be longer than the length of the data buffers specified in the SRB and that no locking, probing, mapping, or flushing of these physical addresses is necessary. All these operations are performed by the stream class.

An SRB is not required if the *VirtualAddress* is not of type PerRequestExtension. This function can only be called to translate an extension address if BusMasterDma is specified in HW_INITIALIZATION_DATA.

7. StreamClassAbortOutstandingRequests

The StreamClassAbortOutstandingRequests routine is used to abort all outstanding requests to a particular stream or the entire device. If the *StreamObject* parameter is not zero all outstanding requests to the specified stream should be aborted by the class driver. If the *StreamObject* parameter is zero all outstanding requests to the device and all streams should be aborted. The Status parameter indicates with what status each request should be aborted.

PVOID StreamClassAbortOutstandingRequests(

IN PVOID *HwDeviceExtension*,

IN PHW_STREAM_OBJECT *HwStreamObject*,

IN NTSTATUS *Status*

);

Parameters

*DeviceExtension*
    Points to the adapter minidriver's storage for adapter data.

*HwStream Object*
    Points to the stream object.

*Status*
    Indicates the status with which to abort each of the requests.

Comments

The class driver automatically sets a ReadyForNextStreamDataRequest, ReadyForNextStreamControlRequest, and/or ReadyForNextDeviceRequest for each request it aborts, depending on the type of requests it aborted.

8. StreamClassQueryMasterClock

The StreamClassQueryMasterClock routine allows slave streams to read the current value of the master clock or the stream time.

VOID StreamClassQueryMasterClock(

IN PHW_STREAM_OBJECT *HwStreamObject,*

IN HANDLE *MasterClockHandle,*

IN TIME_FUNCTION *TimeFunction,*

IN PHW_QUERY_CLOCK_ROUTINE *ClockCallbackRoutine*

);

Parameters

*HwStreamObject*
    Contains the pointer to the stream object for the stream.

*MasterClockHandle*
    Contains the handle for the master clock that was passed to the minidriver through SRB_INDICATE_MASTER_CLOCK

*TimeFunction*
    Indicates which type of clock value to read:
        typeder enum {
        TIME_GET_STREAM_TIME,
        TIME_READ_ONBOARD_CLOCK,
        TIME_SET_ONBOARD_CLOCK,
        } TIME_FUNCTION;

| Value | Description |
|---|---|
| TIME_GET_STREAM_TIME | Returns the current PTS being processed by the master clock, in 100 ns units. |
| TIME_READ_ONBOARD_CLOCK | Returns the current on-board clock value, in 100 ns units. Used for rate matching tunable clocks. A minidriver that has a slave clock can read the time value of the master clock and tune or set the slave clock to this value. |
| TIME_SET_ONBOARD_CLOCK | Causes the minidriver to set or tune the current value of the clock. The correct value for the clock is set in the Time field of the HW_TIME_CONTEXT structure, in 1 00 ns units. |

*ClockCallbackRoutine*
Pointer to the procedure within the minidriver to be called back when the requested time is retrieved from the master clock.

Return Values

None.

Comments

The prototype of the ClockCallbackRoutine routine is as follows:
typedef VOID
**(STREAMAPI * PHW_QUERY_CLOCK_ROUTINE)(**
// query clock callback routine
IN PHW- TIME_CONTEXT *TimeContext*
);

Parameters

*Time Context*
When this procedure is called by the stream class, the *TimeContext* field points to a HW_TIME_CONTEXT structure. The structure supplies the minidriver with the requested clock time.

9.  StreamClassGetDmaBuffer

The StreamClassGetDmaBuffer routine provides the minidriver with a pointer to the DMA buffer to the mindriver, if the minidriver specified a DMA buffer size in the HW_INITIALIZATION_DATA structure.

PVOID StreamClassGetDmaBuffer(
    IN PVOID *HwDeviceExtension*
    );

Parameters

*HwDeviceExtension*
    Points to the minidriver's device extension.

*Return Value*
    The StreamClassGetDmaBuffer routine returns a pointer to the DMA buffer.

10.    StreamClassRegisterFilterWithNoKSPins

The StreamClassRegisterFilterWithNoKSPins routine is used to register filters with DirectShow that have no kernel streaming pins and therefore do not stream in kernel mode.

NTSTATUS StreamClassRegisterFilterWithNoKSPins(
IN PDEVICE_OBJECT *Device Object,*
IN const GUID *\*InterfaceClassGUID,*
IN ULONG *Pin Count,*
IN BOOL *\*PinDirection,*
IN OPTIONAL GUID *\*CategoryList*
);

Parameters

*DeviceObject*
    Points to the device object.

*InterfaceClassGUID*
    Contains the GUID representing the class to register.

*PinCount*
    Contains the count of the number of pins on the filter

*PinDirection*
    Contains an array of Boolean values indicating pin direction for each pin (length of the array is *PinCount*). Output pins are TRUE, input pins are FALSE.

*MediumList*
   Contains an array of PKSMEDIUM_DATA. The length of the array is Pin Count.

*CategoryList*
   Optionally contains an array of GUIDs indicating pin categories. The length of the array is *PinCount*.

Return Value

The StreamClassRegisterFilterWithNoKSPins routine returns NTSTATUS_SUCCESS if the registry key is created.

Comments

The StreamClassRegisterFilterWithNoKSPins routine is typically used for TvTuners, Crossbars, and similar components. On exit, a new binary registry key, FilterData, is created that contains the Mediums and optionally the Categories for each pin on the filter.

11. StreamClassGetNextEvent

The StreamClassGetNextEvent routine retrieves the first or next event from the event queue. If the *CurrentEvent* parameter is a NULL, then the routine will return the first event.

PKSEVENT_ENTRY StreamClassGetNextEvent(

IN PVOID *HwDeviceExtension,*

IN PHW_STREAM_OBJECT *HwStreamObject,*

IN OPTIONAL GUID * *EventGuid,*

IN OPTIONAL ULONG *EventItem,*

IN OPTIONAL PKSEVENT_ENTRY *CurrentEvent*

);

Parameters

*HwDeviceExtension*
   Points to the minidriver's device extension.

*HwStreamObject*
>Points to the stream object for the stream.

*EventGuid*
>Contains an optional GUID specifier that indicates the event to retrieve. A NULL value indicates a wildcard.

*EventItem*
>Contains an optional item specifier that indicates the item within a set of events (as specified by the *EventGuid* member) to return. A value of -1 indicates a wildcard.

*CurrentEvent*
>Points to an event previously returned by the StreamClassGetNextEvent routine. The routine will return the next event of the specified type following *CurrentEvent* in the queue. A NULL value indicates that the first event of the specified type is to be returned.

Return Value

The StreamClassGetNextEvent routine returns the first or next event of the specified type if successful, or NULL if no event is found.

12.  StreamClassReadWriteConfig

The StreamClassReadWriteConfig routine returns or sets the configuration information from the parent from the device. The routine is commonly used to retrieve or set PCI information when the minidriver is controlling a PCI card. The routine must be called at Passive Level.

BOOLEAN STREAMAPI

>StreamClassReadWriteConfig(
>
>IN PVOID *HwDeviceExtension,*
>IN BOOLEAN *Read,*
>IN PVOID *Buffer,*
>IN ULONG *Offset,*
>IN ULONG *Length*
>);

Parameters

*HwDeviceExtension*
>Contains the device extension.

*Read*

Indicates if the action is a read or write. If set to TRUE, the configuration information is read. If set to FALSE, configuration information is written.

*Buffer*

Indicates the buffer to write the configuration information into, or from which to read the information. The buffer is normally a stack buffer (a local variable within the calling routine), or the information could be read directly into the HW device extension.

*Offset*

Indicates the offset within the configuration information to read or write.

*Length*

Indicates the length of the data to read or write.

Return Value

The StreamClassReadWriteConfig routine returns TRUE if the read or write was successful, or it returns FALSE if unsuccessful.

Comments

The StreamClassReadWriteConfig routine can only be called at Passive level. Drivers using stream class synchronization must use a callback from StreamClassCallAtNewPriority to access this routine.

13. StreamClassQueryMasterClockSync

The StreamClassQueryMasterClockSync routine synchronously retrieves the current master clock time. This routine must be used at Dispatch or Passive level. If the caller is running at a raised IRQL (using stream class synchronization with a hardware interrupt), it should use the asynchronous version of this service (StreamClassQueryMasterClock) or use a callback from StreamClassCallAtNewPriority.

VOID STREAMAPI

StreamClassQueryMasterClockSync(

IN HANDLE *MasterClockHandle,*

IN OUT PHW- TIME_CONTEXT *TimeContext*

);

Parameters

*MasterClockHandle*
Contains the handle to the master clock.

*Time Context*
Points to a TimeContext structure, usually a stack or local variable.

Return Value

The StreamClassQueryMasterClockSync routine returns the time specified in the Function member of the TimeContext structure if successful or an error if it is unsuccessful.

Comments

For more information on querying the master clock, see
<u>StreamClassQueryMasterClock</u>.

14.     SteamClassCompleteRequestAndMarkQueueReady

The StreamClassCompleteRequestAndMarkQueueReady routine...
StreamClassCompleteRequestAndMarkQueueReady( IN PHW_STREAM_REQUEST_BLOCK *Srb*
);

Parameters

*SRB*
Contains the

Return Value

The StreamClassCompleteRequest routine returns...........if successful, or..........if it is unsuccessful.

APPENDIX II

Minidriver Functions

The following functions are supplied by the minidriver 36 and are called by the class driver 22. All these routines, except for the completion and setup routine, run to completion and are executed serially. This means that no two of these routines execute at the same time with the same device extension. Because these routines are running at an elevated interrupt request level (potentially blocking other processors), they should execute as quickly as possible.

When the class driver 22 receives a request to be processed by the hardware adapter 40 associated with the minidriver 36, the class driver 22 calls the minidriver's setup routine. The setup routine may allocate memory necessary to process the request. The request is queued by the class driver 22. The class driver 22 then calls the minidriver's start 110 routine to begin the request processing. After this call, the minidriver 36 is responsible for the request until it notifies the class driver 22 that the request has completed.

As the request is processed, the adapter 40 will generate interrupts. When an interrupt is detected, the class driver 22 calls the associated minidriver's interrupt service routine (ISR). After the request has completed, the minidriver 36 notifies the class driver 22 of the completion.

Minidriver Initialization

Every kernel-mode driver, including minidrivers, has to expose a routine named DriverEntry. This routine initializes various driver data structures, including the key HW_INITIALIZATION_DATA structure, and prepares the environment for all the other driver components.

1. DriverEntry

The DriverEntry routine must do the following:
- Locate and allocate any hardware using the HwInitializationData data, as shown in the topic, HW_INITIALIZATION_DATA.
- Access the file object created for the minidriver by the class driver.

The minidriver allocates its stack and then initializes the other fields. All of the fields must be initialized. The DriverEntry should then call StreamClassRegisterAdapter. The adapter minidriver's initialization routine should return the status value returned by StreamClassRegisterAdapter. ULONG DriverEntry(
    IN PVOID *Argument1*,
    IN PVOID *Argument2*
);

Parameters

*Argument1*
Supplies a context value with which the adapter minidriver should call StreamClassRegisterAdapter.

*Argument2*
Supplies a second context value with which the adapter minidriver should call StreamClassRegisterAdapter.

2. HW_INITIALIZATION_DATA

The HW_INITIALIZATION_DATA structure is the hardware initialization data structure. This structure is used in the DriverEntry routine, and is passed between minidriver initialization and stream class initialization.

```
typedef struct HW_INITIALIZATION_DATA {
ULONG HwInitializationDataSize;
PHW_INTERRUPT HwInterrupt;
PHW_RECEIVE_DEVICE_SRB HwReceivePacket;
PHW_CANCEL_SRB HwCancelPacket;
PHW_REQUEST_TIMEOUT_HANDLER HwRequestTimeoutHandler;
ULONG DeviceExtensionSize;
ULONG PerRequestExtensionSize;
ULONG PerStreamExtensionSize;
ULONG FilterInstanceExtensionSize;
BOOLEAN BusMasterDMA;
BOOLEAN Dma24BitAddresses;
ULONG BufferAlignment;
BOOLEAN TurnOffSynchronizatioo;
ULONG DmaBufferSize;
} HW_INITIALIZATION_DATA, *.PHW_INITIALIZATION_DATA;
```

Members

HwInitializationDataSize
Contains the size of the structure, in bytes, as reported by the sizeof function.

HwInterrupt
Points to the adapter minidriver's interrupt routine.

HwReceivePacket
Points to the adapter mini driver's receive device data packet routine. This is the entry point for receiving an SRB request from the stream class driver to the adapter.

HwCancelPacket
Points to the adapter minidriver's cancel packet routine. This routine is called when an outstanding stream or adapter-based request needs to be canceled. This routine is called only under extreme circumstances, such as when an upper layer is attempting to recover and data packets are considered lost.

HwRequestTimeoutHandler
Points to the adapter minidriver's request time-out handler. This routine is called when a stream or adapter -based packet times out. The time out is not necessarily an error, and it is up to the minidriver to determine what to do with the packet that times out.

DeviceExtensionSize
Contains the size in bytes required by the adapter minidriver for its device extension. This storage is used by the adapter minidriver to hold peradapter information. A pointer to this storage is supplied with every call to the adapter minidriver. This data is initialized to zero by the class driver.

PerRequestExtensionSize
Contains the number of bytes of extra workspace needed for each request by the minidriver.

PerStreamExtensionSize
Contains the number of bytes of extra workspace needed for each stream information structure by the minidriver.

FilterInstanceExtensionSize
Contains the number of bytes of workspace needed for each instance extension. Normally set to zero except for hardware that can support multiple instances of the reported streams on the same adapter.

BusMasterDMA
Indicates that the memory pointers passed to the minidriver may be used for direct Bus Master DMA access. If the minidriver uses a translation buffer (to ensure minimum DMA size or correct buffer alignment), this value should be set to FALSE.

Dma24BitAddresses
Indicates that the DMA engine can access only the lower 24 bits of the 32bit address space. This should only be set to TRUE if the minidriver will be doing DMA directly to the buffer and not through a double-buffer scenario.

BufferAlignment
Specifies the alignment requirement of the buffers. For example, if the DMA engine requires the buffers to be quadword aligned, then four should be specified. Note that many data types such as DVD MPEG, will be either byte aligned or word aligned, so DMA hardware should be designed to support it.

TurnOffSynchronization
If this field is set to FALSE, the minidriver cannot be reentered. Therefore, if the minidriver uses a DISPATCH or lower priority callback routine, the minidriver must disable any interrupts that it might receive. If an interrupt controlled by the driver is received while code in the minidriver is running at DISPATCH or lower priority, the interrupt is lost. If an interrupt is received while at HIGH priority, it is queued until the currently executing code is finished.

If this field is set to TRUE, the minidriver must handle all multiprocessor reentrancy issues.

DmaBufferSize
Specifies the size of the single contiguous region of physical memory that the driver needs at hardware initialization time. The memory is returned to the driver when the driver makes the StreamClassGetDmaBuffer call. It is important to use as little physical buffer as possible here, as this is locked physical memory that is not available to the system, even when the streaming class minidriver is not in use.

Minidriver Routines Called by the Class Driver

The minidriver can contain routines that will 5e called by the class driver. The function prototypes are contained in the minidrivers header file. Following is a complete list of routines:

1.   PHW_RECEIVE_DEVICE_SRB

The PHW_RECEIVE_DEVICE_SRB routine is the entry point for sending device-specific SRBs to the minidriver.

typedef VOID

(STREAMAPI *PHW_RECEIVE_DEVICE_SRB)( // HwReceivePacket routine
  IN PHW_STREAM_REQUEST_BLOCK *SRB*);

Parameters

*SRB*
Points to the SRB to be processed.

Return Values

None.

Comments

The PHW_RECEIVE_DEVICE_SRB routine is called when the initial device request is received and after each subsequent ReadyForNextDeviceRequest notification is received for this type. After this call, the adapter minidriver owns the request and is expected to complete it. The request should be completed asynchronously (through interrupt-based or timer-based polling) if the request could potentially take more than a few microseconds to complete. The mini driver should never poll ports waiting for a lengthy request to complete.

2. PHW_REQUEST_TIMEOUT_HANDLER

The PHW_REQUEST _TIMEOUT _HANDLER routine is called by the class driver when an SRB has timed out.

typedef VOID

(STREAMAPI *PHW_REQUEST _TIMEOUT _HANDLER) ( //
HwRequestTimeoutHandler routine

IN PHW_STREAM_REQUEST_BLOCK *SRB*

);

Parameters

*SRB*
Paints to the SRB that has timed out.

Return Values

None.

Comments

The *TimeoutCounter* and *TimeoutOriginal* fields are used to time the request. The class driver will set both of these fields to a nonzero value before the request is received by the minidriver and will then begin counting down the *TimeoutCounter* field until it reaches zero. When it reaches zero, the minidriver's time-out handler will be called. If the minidriver queues a request for a long time, it should set the *TimeoutCounter* to zero to turn off the timer. Once the request is dequeued, it should set the *TimeoutCounter* field to the value in *TimeoutOriginal*.
When a request times out and the time-out handler is called, the minidriver should normally reset its hardware, abort this request, and issue a ReadyForNextStreamDataRequest, ReadyForNextStreamControlRequest, or ReadyForNextDeviceRequest, depending on the type of request. Alternatively, the minidriver may reset its hardware and call StreamClassAbortOutstandingRequests, which will abort all outstanding requests on a particular stream or device. Minidrivers that set the TurnOff Synchronization Boolean should first verify that the request is still in their queues before taking action upon it.

3. PHW_CANCEL_SRB

The PHW_CANCEL_SRB routine is usually called when the minidriver should normally abort a request with STATUS_CANCELLED. It should then issue a ReadyForNextStreamDataRequest, ReadyForNextStreamControlRequest, or ReadyForNextDeviceRequest, depending on the type of request. Minidrivers that set the TurnOff Synchronization Boolean will not receive this call. Alternately, StreamClassAbortAllRequests can be called to abort all requests on a specific stream or the device.

typedef VOID

(STREAMAPI* PHW_CANCEL_SRB)( // HwCancelPacket routine

IN PHW_STREAM_REQUEST_BLOCK *SRB*);

Parameters

*SRB*
Points to the SRB that is to be canceled.

Return Values

None.

4. PHW_INTERRUPT

The PHW_INTERRUPT routine is called when the adapter hardware generates an interrupt. This routine must clear the interrupt on the adapter before it returns.

typedef BOOLEAN

(STREAMAPI* PHW_INTERRUPT) ( // HwInterrupt routine

IN PVOID *DeviceExtension*

);

Parameters

*DeviceExtension*
Supplies the adapter minidriver's storage for adapter data.

*Return Values*

The PHW_INTERRUPT routine returns FALSE if the adapter is not interrupting, or TRUE if the adapter is interrupting.

5. PHW_RESET_ADAPTER

The PHW_RESET_ADAPTER routine is called by the class driver when it determines that the streaming adapter needs to be reset.

typedef BOOLEAN
    (STREAMAPI *PHW_RESET_ADAPTER)( // HwResetAdapter routine

IN PVOID *DeviceExtension*

);

Parameters

*DeviceExtension*
Supplies the adapter minidriver's storage for adapter data.

Return Values

The PHW_RESET_ADAPTER routine returns TRUE if the adapter was successfully reset, or FALSE if the reset attempt failed.

Comments

For multifunction cards, all functions should be reset on this call as appropriate. This function may be called even if the minidriver is not ready for another request.

Stream Object Routines

The following routines are used to access or change the stream object created when an SRB is requested:

1. PHW_RECEIVE_STREAM_DATA_SRB

The PHW_RECEIVE_STREAM_DATA_SRB routine is the entry point for receiving data transfer SRBs to an opened stream. The pointer to this routine is filled into the HW_STREAM_OBJECT structure during the SRB_OPEN_STREAM call.

typedef VOID

(STREAMAPI *PHW_RECEIVE_STREAM_DATA_SRB) (//
HwReceiveDataPacket routine

IN PHW_STREAM_REQUEST _BLOCK *SRB*

);

Parameters

*SRB*
Points to the SRB to be processed.

Return Values

None.

Comments

A separate entry point in the HW_STREAM_OBJECT structure can be used for each stream if required by the minidriver. The PHW_RECEIVE_STREAM_DATA_SRB routine is called when the initial data request for an opened stream is received and after each subsequent ReadyForNextStreamDataRequest notification is received for this type.

After this call, the adapter minidriver owns the request and is expected to complete it. The request should be completed asynchronously (through interrupt-based or timer-based polling) if the request can potentially take more than a few microseconds to complete.

2. PHW_RECEIVE_STREAM_CONTROL_SRB

The PHW_RECEIVE_STREAM_CONTROL_SRB routine is the entry point for receiving nondata transfer (such as SRB_SET_DEVICE_STATE) SRBs to an opened stream. The pointer to this routine is filled into the HW_STREAM_OBJECT structure during the SRB_OPEN_STREAM call (defined later). A separate entry point can be used for each stream if desired by the minidriver.

typedef VOID

(STREAMAPI *PHW_RECEIVE_STREAM_CONTROL_SRB)
( // HwReceiveControl Packet routine

IN PHW_STREAM_REQUEST _BLOCK *SRB*);

Parameters

*SRB*

Points to the SRB to be processed.

Return Values

None.

Comments

The PHW_RECEIVE_STREAM_CONTROL_SRB routine is called when the initial control request for an opened stream is received and after each subsequent ReadyForNextStreamControlRequest notification is received for this type. After this call, the adapter minidriver owns the request and is expected to complete it. The request should be completed asynchronously (through interrupt-based or timer-based polling) if the request could potentially take more than a few microseconds to complete. The minidriver should never poll ports waiting for a lengthy request to complete.

Streaming Header Information

The streaming header information is contained in several structures. The HW_STREAM_HEADER structure is the primary structure and is followed in memory by one or more HW_STREAM_INFORMATION structures. These structures then make up the HW_STREAM_DESCRIPTOR structure.

The following structures are used to report which stream types and properties are supported by the minidriver.

HW_STREAM_HEADER

HW_STREAM_INFORMATION

HW_TIME_CONTEXT

1. HW_STREAM_HEADER

The HW_STREAM_HEADER structure reports which stream types and properties are supported by the minidriver. It is used in conjunction with the HW_STREAM_INFORMATION structure.

```
typedef struct _HW_STREAM_HEADER {
    ULONG            NumberOfStreams;
    ULONG            SizeOfHwStreamInformation;
    ULONG            NumDevPropArrayEntries;
    PKSPROPERTY_SET  DevicePropertiesArray;
    ULONG            NumDevEventArrayEntries;
    PKSEVENT_SET     DeviceEventsArray;
```

```
PKSTOPOLOGY        Topology;
PHW_EVENT_ROUTINE  DeviceEventRoutine
ULONG              Reserved[2];
} HW_STREAM_HEADER, *PHW_STREAM_HEADER;
```

Members

NumberOfStreams
Indicates the number of HW_STREAM_INFORMATION structures that follow the HW_STREAM_HEADER structure. The first of these packets is constructed by the mini driver immediately adjacent to the HW_STREAM_HEADER structure.

SizeOfHwStreaminformation
Indicates the size of the HW_STREAM_INFORMATION structure, which is filled in by the minidriver.

NumDevPropArrayEntries
Indicates the number of property sets supported by the device, which is the number of array entries specified by the pointer below. For more information on property sets, see Kernel Streaming Reference in the WDM DDK documentation.

DevicePropertiesArray
Points to the array of property sets supported by the stream.

NumDevEventArrayEntries
Indicates the number of event sets supported by the device itself.

DeviceEventsArray
Points to the array of device property sets.

Topology
Points to the topology structure. At a minimum, the categories information must be filled in with at least one category GUID. See the WDM Kernel Streaming documentation for more information on this structure.

DeviceEventRoutine
To be defined in a future version.

Reserved
Reserved. Do not use.

2. HW_STREAM_INFORMATION

The HW_STREAM_INFORMATION structure indicates what streams are supported. The stream represented by the first HW_STREAM_INFORMATION structure is designated Stream Zero.

```
typedef struct _HW_STREAM_INFORMATION {
    ULONG              NumberOfPossibleInstances;
    KSPIN_DATAFLOW     DataFlow;
    BOOLEAN            DataAccessible;
    ULONG              NumberOfFormatArrayEntries;
    PKSDATAFORMAT*     StreamFormatsArray;
    PVOID              ClassReserved[4];
    ULONG              NumStreamPropArrayEntries;
    PKSPROPERTY_SET    StreamPropertiesArray;
} HW_STREAM_INFORMATION, *.PHW_STREAM_INFORMATION;
```

Members

NumberOfPossibleInstances
Indicates the number of instances of this stream that are supported by the adapter. For example if this stream information is for an MPEG 2 PES video data stream and the minidriver supports two of them this value would be set to two.

DataFlow
Indicates the direction of data flow for this stream. Set to one of the following types:

```
typedef enum{
    KSPIN_DATAFLOW_IN = 1,
    KSPIN_DATAFLOW_OUT,
    KSPIN_DA T AFLOW_FULLDUPLEX
} KSPIN_DATAFLOW, *PKSPIN_DATAFLOW;
```

DataAccessible
Indicates whether the data is accessible by the class driver. The minidriver should be set to TRUE for any stream that accepts data from the class driver or can return data to the class driver. Streams such as an NTSC output that go to a monitor would not be accessible to the class driver, so the Boolean should be set to false.

NumberOfFormatArrayEntries
To be provided in a future draft.

StreamFormatsArray
Provides a pointer to the following variable length structure, which contains GUIDs specifying what type of data is represented by this stream.

```
typedef struct {
    GUID guidMajorFormat;
    GUID gutdSubFormat;
    GUID guidSpecifier;
    ULONG cbFormat;
```

} KSDATAFORMAT, *PKSDATAFORMAT;

| GUID | Description |
|---|---|
| guidMajorFormat | Specifies the format of the data, such as VIDEO. |
| guidSubFormat | Specifies the subformat of the data, such as MPEG 2 PES. |
| guidSpecifier | Specifies specific parameters supported for the data. |
| cbFormat | Specifies the length of parameters as defined by the specifier GUID above. |

Class Reserved
These fields must not be changed or examined by the minidriver.

NumStreamPropArrayEntries
Indicates the number of property array entries specified by the following pointer. See Kernel Mode Streaming Reference in the WDM DDK documentation for more information on property sets.

StreamPropertiesArray
Points to an array of property sets supported by the stream.

3. HW_TIME_CONTEXT

The HW_TIME_CONTEXT structure is defined as follows:

```
typedef struct _HW_TIME_CONTEXT {
    struct _HW_DEVICE_EXTENSION *HwDeviceExtension;
    struct _HW_STREAM_OBJECT *HwStreamObject;
    TIME_FUNCTION      Function;
    ULONGLONG          Time;
    ULONGLONG          SystemTime;
} HW_TIME_CONTEXT, *PHW_TIME_CONTEXT;
```

Members

Function
Indicates what function is required. The following functions are defined. Note that each of the times returned must be in 100 ns units.

```
typedef enum {
    TIME_GET_STREAM_TIME,
    TIME_READ_ONBOARD_CLOCK,
    TIME_SET_ONBOARD_CLOCK,
} TIME_FUNCTION;
```

| Function | Description |
| --- | --- |
| TIME_GET_STREAM_TIME | Indicates that the minidriver should return the current PTS being processed by the hardware for the master clock in the Time field of the HW_TIME_CONTEXT structure, in 100 ns units. The value is only passed in if the CanReturnStreamTime Boolean is set. The minidriver should also return the current system time (retrieved through KeQueryPerformanceCounter) in the SystemTime field of the HW_TIME_CONTEXT structure at the same time it reads the hardware's PTS value. This additional step allows the caller to correlate that on-board clock time to a certain system time. |
| TIME_READ_ONBOARD_CLOCK | Indicates that the minidriver should return the current value of the master clock in the Time field of the HW_TIME_CONTEXT structure, in 100 ns units. This function will only be passed in if the CanReadOnboardClock Boolean below is set. The minidriver should also return the current system time (retrieved through KeQueryPerformanceCounter) in the SystemTime field of the HW_TIME_CONTEXT structure at the same time it reads the on-board clock value. This additional step allows the caller to correlate that on-board clock time to a certain system time. This function |

| | | |
|---|---|---|
| | | is used for rate-matching tunable clocks. A minidriver that has a slave clock can read the time value of the master clock, and tune or set the slave clock to this value. |
| | TIME_SET_ONBOARD_CLOCK | Indicates that the minidriver should set or tune the current value of the clock. The correct value for the clock is set in the Time field of the HW_TIME_CONTEXT structure, in 100 ns units. This function will only be passed in if the CanSetOnboardClock Boolean is set. The current system time (retrieved through KeQueryPerformanceCounter) is also set in the SystemTime field of the HW_TIME_CONTEXT structure at the same time it reads the on-board clock value. This additional step allows the minidriver to correlate that onboard clock time in the Time field to a certain system time. |
| | Time | |
| | System Time | |

APPENDIX III

Stream Request Block

This section describes the format of the SRB. The SRB contains information necessary for the minidriver 36 to process data and control requests. There are SRB commands specific to the driver 22 and adapter 40, and SRB commands specific to each stream supported by the adapter 40.

1. PORT_CONFIGURATION_INFORMATION

The PORT_CONFIGURATION_INFORMATION structure contains the configuration information necessary to initialize the adapter.

```
typedef struct _PORT_CONFIGURATION_INFORMATION {
    ULONG            SizeOfThisPacket,
    PVOID            HwDeviceExtension;
    PDEVICE_OBJECT   ClassDeviceObject;
    PDEVICEOBJECT    PhysicalDeviceObject;
    ULONG            ystemIoBusNumber,
    INTERFACE_TYPE   AdapterInterfaceType;
    ULONG            BusInterruptlevel;
    ULONG            BusInterruptVector,
    KINTERRUPT_MODE  InterruptMode;
    ULONG            DmaChannel;
    ULONG            NumberOfAccessRanges;
    PACCESS_RANGE    AccessRanges;
    ULONG            StreamDescriptorSize;
    PIRP             Irp;
} PORT_CONFIGURATION_INFORMATION, PPORT_CONFIGURATION_INFORMATION;
```

Members

SizeOfThisPacket
Indicates the length of the PORT_CONFIGURATION_INFORMATION structure as returned by sizeof. Since this structure may grow in later releases, the adapter minidriver should check that the length is greater than or equal to the length expected. This field is always initialized.

HwDeviceExtension
Contains the adapter minidriver's adapter data storage. This storage is initialized to zero before this call is made.

ClassDeviceObject
Contains the device object associated with this adapter. The minidriver can save this pointer in its device extension if it needs to call system services.

PhysicalDeviceObject
The device object for the physical device and typically is not used by the minidriver.

SystemIoBusNumber
Indicates that the system I/O bus number on which the adapter resides. This number is zero for machines with only one I/O bus. This field is always initialized by the class driver.

AdapterInterfaceType
Indicates the type of the bus being initialized, such as EISA or PCI. Supported types include:
Internal
Isa
Eisa
MicroChannel
TurboChannel
PCI Bus
VMEBus
NuBus
PCMCIABus
CBus
MPIBus
MPSABus
This field is always initialized.

BusInterruptLevel
Indicates the bus interrupt request level. This level corresponds to the IRQL on PCI, ISA, and MCA buses. The uninitialized value is zero.

BusInterruptVector
Indicates the bus vector returned by the adapter. This is used for systems that have I/O buses that use interrupt vectors. For ISA, MCA, and EISA I/O buses, this field is unused. The uninitialized value is zero.

InterruptMode
Indicates whether this adapter uses level or latched type interrupts. This value is always initialized.

DmaChannel
Indicates the DMA channel used by the adapter. The un initialized value is 0XFFFFFFFF. This field is normally only used for ISA DMA Bus master cards.

NumberOfAccessRanges
Indicates the number of elements in the AccessRanges array.

AccessRanges
Supplies a pointer to an array of ACCESS_RANGE structures. The number of elements is indicated by the NumberOfAccessRanges field. The driver should fill in each structure for the adapter. The uninitialized values for the structures are zero.

AccessRanges will be NULL if NumberOfAccessRanges is zero. See Comments for information on the structure used to define access ranges.

StreamDescriptorSize
Contains the size of the stream descriptor structure that is filled in by the minidriver in the SRB_GET_STREAM_INFO command (defined later in this document). The minidriver should fill in this size to be equal to the size of the HW_STREAM_HEADER Structure plus the sizes of each of the variable length HW_STREAM_INFORMATION structures needed by the minidriver.

Irp
Points to the PNP IRP for the start and typically is not used by the minidriver.

Comments

The ACCESS_RANGE structure is used to define access ranges for the *AccessRanges* value. These ranges indicate to the system which ports and memory address are being used by the card.

```
typedef struct_ACCESS_RANGE {
    STREAM_PHYSICAL_ADDRESS RangeStart;
    UlONG        RangeLength;
    BOOLEAN      RangeInMemory;
} ACCESS_RANGE, *PACCESS_RANGE;
```

Members

RangeStart
Indicates the starting memory address or port number.

RangeLength
Indicates the length in bytes or number of ports of the range. This value should indicate the range actually decoded by the adapter.

RangeInMemory
Indicates the range is in memory, rather than in 110 space.

2.     HW_STREAM_OBJECT

The HW_STREAM_OBJECT is the structure created when an SRB request is received.

```
typedef    struct_HW_STREAM_OBJECT {
    ULONG      SizeOfThisPacket;
    LONG       StreamNumber,
    PVOID      HwStreamExtension;
    PHW_RECEIVE_STREAM_DATA_SRB  ReceiveDataPacket;
    PHW_RECEIVE_STREAM_CONTROL_SRB    ReceiveControlPacket;
    HW_CLOCL_OBJECT HwClockObject;
```

```
    BOOLEAN     Dma;
    BOOLEAN     Plo;
    PVOID               HwDeviceExtension;
    ULONG               StreamHeaderMediaSpecific;
    ULONG               StreamHeaderWorkspace;
} HW_STREAM_OBJECT. .PHW_STREAM_OBJECT;
```

Members

SizeOfThisPacket
Indicates the size of this packet Filled in by the stream class. The minidriver should verify that the size of the structure it expects is less than or equal to the value in this element.

StreamNumber
Indicates the number of the stream to be opened. The number corresponds with the location of the stream's HW_STREAM_INFORMATION structure in the information returned by SRB_GET_STREAM_INFO defined earlier.

HwStreamExtension
Points to the minidriver's stream extension workspace, and is zeroinitialized.

ReceiveDataPacket
The minidriver fills in the vector to its HW_RECEIVE_STREAM_DATA_SRB routine as defined in this document.

ReceiveControlPacket
The minidriver fills in the vector to its HW_RECEIVE_STREAM_CONTROL_SRB routine as defined in this document.

HwClockObject
The clock object, defined in this document, contains information required for data synchronization.

Dma
If set to TRUE, indicates the minidriver will use DMA to transfer data directly from the data packets for this stream type. If the device has to double-buffer data into a DMA buffer, but does not actually use DMA from or to the user buffers directly, this should be set to FALSE. Note that both the DMA and PIO values can be set, if necessary.

Pio
Indicates that the minidriver will use PIO to transfer data for this stream type. This means that the processor needs to touch some or all of the data in the data packets to transfer it to the device. Note that both the DMA and PIO values can be set, if necessary.

HwDeviceExtension
Points to the minidriver's device extension.

StreamHeaderMediaSpecific
Contains the size of media-specific, per-stream header expansion.

StreamHeaderWorkspace
Size of per-stream header workspace.

3. HW_STREAM_REQUEST_BLOCK

The HW_STREAM_REQUEST_BLOCK structure is the basis for all SRBs. The structure contains information necessary for the minidriver to process data and control requests. There are SRB commands specific to the adapter and commands specific to each stream supported by the adapter.

```
typedef struct _HW_STREAM_REQUEST_BLOCK {
    ULONG              SizeOfThisPacket;
    SRB_COMMAND        Command;
    NTSTATUS           Status;
    PHW_STREAM_OBJECT  Stream Object;
    PVOID              HwDeviceExtension;
    PVOID              SRBExtension;

union - CommandData {
    PKSSTREAM_HEADER           Data BufferArray,
    PHW_STREAM_DESCRIPTOR      StreamBuffer,
    KSSTATE                    StreamState;
    PSTREAM_TIME_REFERENCE     TimeReference;
    PSTREAM_PROPERTY_DESCRIPTOR PropertyInfo;
    PKSDATAFORMAT              OpenFormat;
    struct _PORT_CONAGURATION_INFORMATION *ConfigInfo;
    HANDLE                     MasterClockHandle;
    DEVICE_POWER_STATE DeviceState;
    } CommandData;

ULONG    NumberOfBuffers;
    ULONG    TimeoutCounter,
    ULONG    TimeoutOriginal;
    struct _HW_STREAM_REQUEST_BLOCK *NextSRB;
    PIRP     Irp;
    ULONG    Flags;
    PVOID    HwInstanceExtension;

union {
```

```
    ULONG      NumberOfBytesToTransfer;
    ULONG      ActualBytesTransferred;
};

ULONG      Reserved;
    PKSSCATTER_GATHER ScatterGatherBuffer
    ULONG      NumberOfPhysicalPages;
} HW_STREAM_REQUEST_BLOCK, *PHW_STREAM_REQUEST_BLOCK;
```

Members

SizeOfThisPacket
Contains the size of the SRB.

Command
Contains the SRB command to be performed. See SRB Commands defined in the following section.

Status
Contains the status of the completing SRB.

StreamObject
Pointer to the stream object for this request. Only valid for stream-specific requests.

HwDeviceExtension
Points to the minidriver's device extension.

SRBExtension
Pointer to the minidriver's per-request workspace. Not zero initialized.

CommandData
Command-specific data. The fields in Command Data are as follows.

| Field | Description |
| --- | --- |
| DataBufferArray | Pointer to the data descriptor for SRB_READ_ or SRB_WRITE_DATA. |
| StreamBuffer | Pointer to the stream descriptor for SRB_GET_STREAM_INFO. |
| StreamState | Pointer to the stream state for SRB_GET_ or SRB_SET_DEVICE_STATE. |

| | |
|---|---|
| TimeReference | Pointer to the time structure for SRB_GET_ or SRB_SET_ONBOARD_CLOCK. |
| PropertyInfo | Pointer to the property descriptor for SRB_GET_or SRB_SET_PROPERTY. |
| OpenFormat | Pointer to the requested format for SRB_OPEN_STREAM and SRB_PROPOSE_DATA_FORMAT. |
| ConfigInfo | Pointer to the PORT_CONFIGURATION_INFORMATION structure for SRB_INITIALIZE_DEVICE. |
| MasterClockHandle | Indicates the master clock handle for SRB_OPEN_MASTER_CLOCK or SRB_INDICATE_MASTER_CLOCK. |
| DeviceState | Indicates power state. |

NumberOfBuffers
Indicates the number of KSSTREAM_HEADER elements pointed to by the DataBufferArray field.

TimeoutCounter
Indicates the number of seconds until the request is timed out by the class driver. The class driver sets both the TimeoutCounter and the TimeoutOriginal to nonzero values when the request is received by the minidriver, and then begins counting down the TimeoutCounter until it reaches zero. A setting of zero indicates that the request is not timed.

TimeoutOriginal
Indicates the original setting of TimeoutCounter in seconds.

NextSRB
Contains queue link field for the minidriver. Always set to zero by the class driver.

Irp
Paints to the original IRP for the request. Most minidrivers need not look at the IRP.

Flags
Contains flag definitions for the SRB. The following flags are provided.

| Flag | Description |
|---|---|
| SRB_HW_FLAGS_STREAM_REQUEST | Indicates that request is for a stream, rather than for the device. |
| SRB_HW_FLAGS_DATA_TRANSFER | Indicates that request is for data, rather than for control. |

HwInstanceExtension
Points to the minidriver's instance extension, if applicable.

NumberOfBytesToTransfer
Indicates the total number of bytes to transfer for SRB_READ_DATA or SRB_WRITE_DATA.

ActualBytesTransferred
Indicates the actual number of bytes transferred.

ScatterGatherBuffer
Indicates a buffer pointing to an array of scatter-gather elements. This array of elements can be used by the minidriver to use DMA directly to or from host memory. Note that no locking, probing, mapping, or flushing of these physical addresses is necessary; all these operations are performed by the stream class. See the Comments section for information on the structure used for each element in the scatter-gather array.

NumberOfPhysicalPages
Contains the number of scatter-gather elements pointed to by the ScatterGatherBuffer pointer.

Comments

The fields PhysicalScatterGatherList and NumberOfPhysicalElements are filled in only if the minidriver has indicated DMA support in the STREAM_OBJECT structure.
Each element in the scatter-gather array has the following format:

```
typedef struct {
    PHYSICAL_ADDRESS PhysicalAddress;
    ULONG Length;
} KSSCATTER_GATHER, *PKSSCATTER_GATHER;
```

Members

PhysicalAddress
Contains the physical address of this segment.

Length
Contains the length of the segment.

APPENDIX IV

SRB Command Codes for the Adapter

SRB command codes are used in the HW_STREAM_REQUEST_BLOCK and are used to provide information to the class drivers. SRB commands can be either stream specific or device/instance specific.

1. SRB_INITIALIZE_DEVICE

The SRB_INITIAlIZE_DEVICE command is sent by the class driver when an adapter needs to be initialized. The PORT_CONFIGURATION_INFORMATION structure, which contains parameters necessary to initialize the adapter, is passed in through the CommandData. ConfigInfo field of the SRB by the class driver.
The PORT_CONFIGURATION_INFORMATION structure is partially initialized by the class driver before the SRB_INITIALIZE_DEVICE function is called. The specific fields initialized depend on the adapter mini driver and the information available to the class driver. All uninitialized fields are set to a well-known value as defined in the following text. All relevant fields should be updated by the adapter minidriver.
The fields required to find and set up the adapter (IRQ, port address, and so on) must have been filled in by the class driver. If not, the minidriver should return with STATUS_NO_SUCH_DEVICE.

Return Codes

The following codes are provided.

| Code | Description |
| --- | --- |
| STATUS_SUCCESS | Indicates that a host adapter was found and the configuration information was successfully determined. |
| STATUS_IO_DEVICE_ERROR | Indicates that a host adapter was found, but there was an error in obtaining the configuration information. If possible, such an error should be logged. |
| STATUS_NO_SUCH_DEVICE | Indicates that the supplied configuration information was invalid. |

2. SRB_UNINITIALIZE_DEVICE

The SRB_UNINITIALIZE_DEVICE command is sent by the class driver when the adapter needs to be uninitialized. The minidriver should deallocate any system resources it allocated, aside from those allocated through the class driver (such as the uncached extension, IRQs, and so on) that will be automatically deallocated by the class driver. The minidriver should permanently disable adapter interrupts on this call, if possible.

Return Codes

The following codes are provided.

| Code | Description |
| --- | --- |
| STATUS_SUCCESS | Indicates successful completion of the command. |
| STATUS_NOT IMPLEMENTED | Indicates that the function is not supported by the minidriver. |
| STATUS_ADAPTER_HARDWARE_ERROR | Indicates that the minidriver cannot uninitialize at this time. |

3. SRB_GET_STREAM_INFO

The SRB_GET_STREAM_INFO command is sent by the class driver to retrieve information about the streams supported by the minidriver's hardware. When the minidriver receives this command, the minidriver builds the HW_STREAM_HEADER structure, followed by one or more HW_STREAM_INFORMATION structures, in the buffer provided by the class driver and pointed to by CommandData.StreamBuffer. The size of this buffer is indicated by the minidriver in the StreamDescriptorSize field in the PORT_CONFIGURATION_INFORMATION structure.

Return Codes

The following codes are provided.

| Code | Description |
| --- | --- |
| STATUS_SUCCESS | Indicates successful completion of the command. |
| STATUS_NOT IMPLEMENTED | Indicates that the function is not supported by the minidriver. |
| STATUS_IO_DEVICE_ERROR | Indicates that a hardware failure occurred. |

4. SRB_OPEN_STREAM

The SRB_OPEN_STREAM command is sent by the class driver to open a stream. The stream to be opened is specified by the HW_STREAM_OBJECT, which is pointed to by the StreamObject field in the SRB. The CommandData.OpenFormat field may point to additional format information about the stream being opened.

When the minidriver receives the SRB_OPEN_STREAM command, the minidriver should determine if the specified stream is able to be opened at this time. If the stream can be opened, the HW_STREAM_OBJECT structure is updated by the minidriver, and STATUS_SUCCESS is returned. If the number of instances specified as stream are already opened, or the hardware resources to open this stream are otherwise unavailable, the minidriver should return an appropriate error status.

Return Codes

The following codes are provided.

| Code | Description |
| --- | --- |
| STATUS_SUCCESS | Indicates successful completion of the command. |
| STATUS_NOT_IMPLEMENTED | Indicates that the function is not supported by the minidriver. |
| STATU S_TOO_MANY_NODES | Indicates that there are not enough resources to open this stream. |
| STATUS_IO_DEVICE_ERROR | Indicates that a hardware failure occurred. |

5. SRB_CLOSE_STREAM

The SRB_CLOSE_STREAM command is sent by the class driver to close a previously opened stream. The stream to be closed is specified by the HW_STREAM_OBJECT structure referenced by the StreamObject field in the SRB. If the stream is successfully closed by the minidriver, STATUS_SUCCESS should be returned. Otherwise, an appropriate error status should be returned.

Return Codes

The following codes are provided.

| Code | Description |
| --- | --- |
| STATUS_SUCCESS | Indicates successful completion of the command. |
| STATUS_NOT IMPLEMENTED | Indicates that the function is not supported by the minidriver. |
| STATUS_IO_DEVICE_ERROR | Indicates that a hardware failure occurred. |

6. SRB_OPEN_DEVICE_INSTANCE

The SRB_OPEN_DEVICE_INSTANCE command is sent by the class driver to open an instance of the adapter. Most adapters do not support instancing, so the InstanceExtensionSize field in the HW_INITIALIZATION_DATA structure should be set to zero and should never receive this command.

If the minidriver supports device instancing, this command will be sent by the class driver each time a new instance of the adapter is opened. For example, a DSP decoder that can allocate *n* number of instances of the streams specified. The HwInstanceExtension field in the SRB should then be set to the minidriver's per-instance workspace by the class driver.

Return Codes

The following codes are provided.

| Code | Description |
| --- | --- |
| STATUS_SUCCESS | Indicates successful completion of the command. |
| STATUS_NOT IMPLEMENTED | Indicates that the function is not supported by the minidriver. |
| STATUS_TOO_MANY_NODES | Indicates that there are not enough resources to open this stream. |
| STATUS_IO_DEVICE_ERROR | Indicates that a hardware failure occurred. |

7. SRB_CLOSE_DEVICE_INSTANCE

The SRB_CLOSE_DEVICE_INSTANCE command is sent by the class driver to close a previously opened instance of the adapter.

Return Codes

The following codes are provided.

| Code | Description |
|---|---|
| STATUS_SUCCESS | Indicates successful completion of the command. |
| STATUS_NOT IMPLEMENTED | Indicates that the function is not supported by the minidriver. |
| STATUS_IO_DEVICE_ERROR | Indicates that a hardware failure occurred. |

8. B_GET_DEVICE_PROPERTY

The SRB_GET_DEVICE_PROPERTY command controls the changing of property values for the device. For more information on property sets, see Kernel Mode Streaming Reference in the WDM DDK Documentation.

Return Codes

The following codes are provided.

| Code | Description |
|---|---|
| STATUS_SUCCESS | Indicates successful completion of the command. |
| STATUS_NOT IMPLEMENTED | Indicates that the function is not supported by the minidriver. |
| STATUS_IO_DEVICE_ERROR | Indicates that a hardware failure occurred. |

9. SRB_SET_DEVICE_PROPERTY

The SRB_SET_DEVICE_PROPERTY command controls the changing of property values for the device. For more information on property sets, see Kernel-Mode Streaming Reference in the WDM DDK Documentation.

Return Codes

The following codes are provided.

| Code | Description |
| --- | --- |
| STATUS_SUCCESS | Indicates successful completion of the command. |
| STATUS NOT IMPLEMENTED | Indicates that the function is not supported by the minidriver. |
| STATUS_IO_DEVICE_ERROR | Indicates that a hardware failure occurred. |

10. SRB_CHANGE_POWER_STATE

The SRB_CHANGE_POWER_STATE command is used to change the power state.

Return Codes

The following codes are provided.

| Code | Description |
| --- | --- |
| STATUS_SUCCESS | Indicates successful completion of the command. |
| STATUS_NOT IMPLEMENTED | Indicates that the function is not supported by the minidriver. |
| STATUS_IO _DEVICE_ERROR | Indicates that a hardware failure occurred and low power cannot be invoked. |

11. SRB _UNKNOWN_DEVICE_COMMAND

The SRB_UNKNOWN_DEVICE_COMMAND command indicates that the IRP function is unknown to the class driver.

12. SRB_PAGING_OUT_DRIVER

The SRB_PAGING_OUT_DRIVER command indicates that the driver is to be paged out. It is only sent if enabled in the registry. Adapter interrupts should be disabled and a STATUS_SUCCESS should be returned.

13. SRB_GET_DATA_INTERSECTION

Information on the SRB_GET_DATA_INTERSECTION command is not now provided

APPENDIX V

Stream-specific Command Codes

Stream-specific command codes are defined for a previously opened stream. The StreamObject field in the SRB specifies the stream on which to carry out the specified command.

The stream-specific SRB command codes, with underlying structures shown in the topic, are as follows:

1. SRB_READ_DATA

The SRB_READ_DATA command is issued to read one or more blocks of data to or from the specified stream.

The Command Data. DataBufferArray field points to one or more KSSTREAM_HEADER structures as defined in the following text.

The number of KSSTREAM_HEADER structures pointed to by the CommandData. DataBufferArray field is indicated by the NumberOfBuffers field in the SRB.

Return Codes

The following codes are provided.

| Code | Description |
| --- | --- |
| STATUS SUCCESS | Indicates successful completion of the command. |
| STATUS_IO_DEVICE_ERROR | Indicates that the function is not supported by the minidriver. |
| STATUS_NOT IMPLEMENTED | Indicates that a hardware failure occurred. |

2. SRB_WRITE_DATA

The SRB_WRITE_DATA command is issued to write one or more blocks of data to or from the specified stream.

The CommandData.DataBufferArray field points to one or more KSSTREAM_HEADER structures as defined in the following text.

The number of KSSTREAM_HEADER structures pointed to by the CommandData.DataBufferArray field is indicated by the NumberOfBuffers field in the SRB.

Return Codes

The following codes are provided.

| Code | Description |
| --- | --- |
| STATUS_SUCCESS | Indicates successful completion of the command. |
| STATUS NOT IMPLEMENTED | Indicates that the function is not supported by the minidriver. |
| STATUS_IO_DEVICE_ERROR | Indicates that a hardware failure occurred. |

3. SRB_SET_STREAM_STATE

The SRB_SET_STREAM_STATE command controls the state of the specified stream. The CommandData.StreamState field in the SRB is set by the class driver to one of the following states:

```
typedef enum {
    KSSTATE_STOP,
    KSSTATE_PAUSE,
    KSSTATE_RUN
} KSSTATE, *PKSSTATE;
```

The minidriver should set the stream to the specified state and return STATUS_SUCCESS if successful. An appropriate error code should be returned if the operation fails.

Return Codes

The following codes are provided.

| Code | Description |
| --- | --- |
| STATUS_SUCCESS | Indicates successful completion of the command. |
| STATUS_NOT IMPLEMENTED | Indicates that the function is not supported by the minidriver. |
| STATUS_IO_DEVICE_ERROR | Indicates that a hardware failure occurred. |

4. SRB_GET_STREAM_PROPERTY

The SRB_GET_STREAM_PROPERTY command controls the changing of property set values for the stream. For more information on property sets, see Kernel Mode Streaming Reference.

Return Codes

The following codes are provided.

| Code | Description |
| --- | --- |
| STATUS_SUCCESS | Indicates successful completion of the command. |
| STATUS_NOT IMPLEMENTED | Indicates that the function is not supported by the minidriver. |
| STATUS_IO_DEVICE_ERROR | Indicates that a hardware failure occurred. |

5. SRB_SET_STREAM_PROPERTY

The SRB_SET_STREAM_PROPERTY command controls the changing of property set values for the stream. For more information on property sets, see Kernel Mode Streaming Reference.

Return Codes

The following codes are provided.

| Code | Description |
| --- | --- |
| STATUS_SUCCESS | Indicates successful completion of the command. |
| STATUS_IO_DEVICE_ERROR | Indicates that the function is not supported by the minidriver. |
| STATUS_NOT_IMPLEMENTED | Indicates that a hardware failure occurred. |

6.     SRB_OPEN_MASTER_CLOCK

The SRB_OPEN_MASTER_CLOCK command indicates that the stream referenced by the stream object in the SRB has been chosen to be the master clock. The HwClockObject in the HW_STREAM_OBJECT must have been filled in correctly for a particular stream to be chosen as the master clock.

The CommandData.MasterClockHandle field points to the handle of the master clock, which the minidriver should retain.

Return Codes

The following codes are provided.

| Code | Description |
| --- | --- |
| STATUS_SUCCESS | Indicates successful completion of the command. |
| STATUS_IO_DEVICE_ERROR | Indicates that the function is not supported by the minidriver. |
| STATUS_NOT_IMPLEMENTED | Indicates that a hardware failure occurred. |

7.     SRB_CLOSE_MASTER_CLOCK

The SRB_CLOSE_MASTER_CLOCK command indicates that the stream referenced by the stream object in the SRB is no longer the master clock.

Return codes

The following codes are provided.

| Code | Description |
| --- | --- |
| STATUS_SUCCESS | Indicates successful completion of the command. |
| STATUS_NOT_IMPLEMENTED | Indicates that the function is not supported by the minidriver. |
| STATUS_IO_DEVICE_ERROR | Indicates that a hardware failure occurred. |

8. SRB_INDICATE_MASTER_CLOCK

The SRB_INDICATE_MASTER_CLOCK command gives the handle to the master clock to slave streams. If the handle is zero, this stream is treated as free running by the minidriver. Also, until the minidriver receives this function for a particular stream, the minidriver should assume that the stream is free running. The minidriver can use this handle to read the current master clock value using StreamClassQueryMasterClock, defined in this document. Note that if the handle passed into this function for a slave pin is the same as the handle passed into the minidriver through SRB_OPEN_MASTER_ClOCK, the minidriver can read the time from the master clock directly since it controls the master and the slave. This is not necessary, but is an optimization.

The CommandData. MasterClockHandle field points to the handle for the master clock, which the minidriver should retain. If this handle is zero, this indicates to the minidriver that this stream is now free running and cannot slave to a master clock.

Return Codes

The following codes are provided.

| Code | Description |
| --- | --- |
| STATUS_SUCCESS | Indicates successful completion of the command. |
| STATUS_NOT_IMPLEMENTED | Indicates that the function is not supported by the minidriver. |
| STATUS_IO_DEVICE_ERROR | Indicates that a hardware failure occurred. |

9. SRB_PROPOSE_DATA_FORMAT

The SRB_PROPOSE_DATA_FORMAT command queries the minidriver to determine if the minidriver can change the format of a particular stream. If the minidriver is able to switch the stream to the specified format. STATUS_SUCCESS is returned. Note that this function only proposes a new format, but does not change it.

The CommandData.OpenFormat passes the format to validate.

If the minidriver is able to accept the new format, the class driver at some later time may send the minidriver a format change, which is indicated by an OptionsFlags flag in a KSSTREAM_HEADER structure.

Return codes

The following codes are provided.

| Code | Description |
| --- | --- |
| STATUS SUCCESS | Indicates successful completion of the command. |
| STATUS_IO_DEVICE_ERROR | Indicates that the function is not supported by the minidriver. |
| STATUS_NOT IMPLEMENTED | Indicates that the proposed format is not supported by the minidriver. |
| STATUS_NOT SUPPORTED | Indicates that a hardware failure occurred. |

10. SRB_SET_STREAM_RATE

Information to be provided in a future draft.

11. SRB_UNKNOWN_STREAM_COMMAND

The SRB_UNKNOWN_STREAM_COMMAND command indicates that the IRP function is unknown to the class driver. The function is then passed down the next driver in the stack.

12. SRB_PROPOSE_STREAM_RATE

Information not now provided.

What is claimed is:

1. A computer implemented method of operation for a stream class driver which functions in conjunction with a minidriver that is associated with a particular hardware adapter which generates or receives streaming data, wherein the stream class driver implements one or more system operations that are independent of any particular hardware adapter, and wherein the minidriver implements one or more operations that depend on the particular hardware adapter's design, the method comprising:
   initializing a stream class driver which functions in conjunction with a minidriver that is associated with a particular hardware adapter which generates or receives streaming data; and
   initializing said adapter;
   wherein said stream class driver is initialized to implement the following, after said adapter has been initialized and after said minidriver has been paged out of active memory to free resources for other uses,
      paging said minidriver into active memory upon receipt of a data stream request in preparation for using one or more routines implemented by the minidriver for the particular hardware adapter,
      providing a command to the one or more routines implemented by said minidriver to turn on power to said adapter,
      providing a data stream open command and stream structure data to the one or more routines implemented by said minidriver,
      providing a stream read or write command to the one or more routines implemented by said minidriver,
      providing properties and control information related to said stream request to the one or more routines implemented by said minidriver,
      providing a stream close command to the one or more routines implemented by said minidriver upon receipt of a data stream termination command, and
      providing an uninitialization command to the one or more routines implemented by said minidriver for uninitializing said adapter.

2. A method of operation for a stream class driver as recited in claim 1, wherein said data stream is a video data stream.

3. A method of operation for a stream class driver as recited in claim 1, wherein said data stream is an audio data stream.

4. A method of operation for a stream class driver as recited in claim 1, the stream class driver further being configured for implementing the following prior to providing an uninitialization command to said minidriver:
   providing a second data stream open command and second stream structure data to said minidriver upon receipt of a second data stream request,
   providing a second stream read or write command to said minidriver,
   providing properties and control information related to said second stream request to said minidriver, wherein said first and second data streams are opened concurrently, and
   providing a second stream close command to said minidriver upon receipt of a data stream termination command for said second data stream.

5. A computer program product for use in a computing system that includes a stream class driver which functions in conjunction with a minidriver that is associated with a particular hardware adapter which generates or receives streaming data, wherein the stream class driver implements one or more system operations that are independent of any particular hardware adapter, and wherein the minidriver implements one or more operations that depend on the particular hardware adapter's design, and wherein said adapter has been initialized and said minidriver has been paged out of active memory to free resources for other uses, the computer program product comprising a computer usable medium having computer readable program code means embodied thereon for implementing the method recited in claim 1.

6. A computer implemented method of operation for a stream class driver which functions in conjunction with a minidriver that is associated with a particular hardware adapter which generates or receives streaming data, wherein the stream class driver implements one or more system operations that are independent of any particular hardware adapter, and wherein the minidriver implements one or more operations that depend on the particular hardware adapter's design, the method of operating the stream class driver comprising:
   receiving initialization data from said minidriver that identifies one or more routines implemented by the minidriver for the particular hardware adapter,
   registering said initialization data for use when the one or more routines are needed,
   creating a device object for said adapter that is capable of being shared by the stream class driver and the minidriver,
   providing a command to at least one of the one or more routines implemented by said minidriver to initialize said adapter,
   requesting adapter stream information from at least one of the one or more routines implemented by said minidriver, wherein said adapter stream information comprises one or more hardware stream descriptors for one or more streams supported by the particular hardware adapter,
   registering said adapter stream information;
   providing a command to said minidriver to turn off power to said adapter, and paging out said minidriver;
   paging said minidriver into active memory upon receipt of a data stream request in preparation for using one or more routines implemented by the minidriver for the particular hardware adapter,
   providing a command to the one or more routines implemented by said minidriver to turn on power to said adapter,
   providing a data stream open command and stream structure data to the one or more routines implemented by said minidriver;
   providing a stream read or write command to the one or more routines implemented by said minidriver;
   providing a stream close command to the one or more routines implemented by said minidriver upon receipt of a data stream termination command;
   providing a second data stream open command and second stream structure data to said minidriver upon receipt of a second data stream request;
   providing a second stream read or write command to said minidriver;
   providing properties and control information related to said second stream request to said minidriver, wherein said first and second data streams are opened concurrently; and
   providing a second stream close command to said minidriver upon receipt of a data stream termination command for said second data stream.

7. A method as defined in claim 6, further comprising, providing properties and control information related to said stream request to the one or more routines implemented by said minidriver.

8. A method as defined in claim 6, further comprising, providing an uninitialization command to the one or more routines implemented by said minidriver for uninitializing said adapter.

9. A method of operation for a stream class driver as recited in claim 6, wherein said data stream is a video data stream.

10. A method of operation for a stream class driver as recited in claim 6, wherein said second data stream is an audio data stream.

11. A computer program product for use in a computing system that includes a stream class driver which functions in conjunction with a minidriver that is associated with a particular hardware adapter which generates or receives streaming data, wherein the stream class driver implements one or more system operations that are independent of any particular hardware adapter, and wherein the minidriver implements one or more operations that depend on the particular hardware adapter's design, the computer program product comprising a computer usable medium having computer readable program code means embodied therein for implementing the method recited in claim 6.

12. A computer program product as defined in claim 11, further comprising, computer readable program code means for providing properties and control information related to said stream request to the one or more routines implemented by said minidriver.

13. A computer program product as defined in claim 11, further comprising, computer readable program code means for providing an uninitialization command to the one or more routines implemented by said minidriver for uninitializing said adapter.

* * * * *